(12) United States Patent
Kinjo

(10) Patent No.: US 6,519,046 B1
(45) Date of Patent: Feb. 11, 2003

(54) PRINTING METHOD AND SYSTEM FOR MAKING A PRINT FROM A PHOTO PICTURE FRAME AND A GRAPHIC IMAGE WRITTEN BY A USER

(75) Inventor: Naoto Kinjo, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/035,872

(22) Filed: Mar. 6, 1998

(30) Foreign Application Priority Data

| Mar. 17, 1997 | (JP) | ............................................. 9-063537 |
| Mar. 21, 1997 | (JP) | ............................................. 9-068438 |
| Mar. 24, 1997 | (JP) | ............................................. 9-069367 |
| Mar. 26, 1997 | (JP) | ............................................. 9-073033 |

(51) Int. Cl.⁷ ........................... G06F 15/00; H04N 1/04; H04N 9/04; H04N 5/262
(52) U.S. Cl. ..................... 358/1.1; 358/487; 348/207.1; 348/239
(58) Field of Search ................................. 358/500, 527, 358/504, 406, 487, 101, 1.9, 1.15, 450; 348/96–98, 239, 207.99, 207.1, 207.11, 207.2, 211.99, 211.14; 396/332, 333, 551, 556; H04N 1/00

(56) References Cited

U.S. PATENT DOCUMENTS

| 4,471,382 A | * | 9/1984 | Toyoda et al. .............. 358/183 |
| 4,642,700 A | * | 2/1987 | Ohta et al. .................. 358/285 |
| 5,072,253 A | * | 12/1991 | Patton ......................... 358/527 |
| 5,138,460 A | * | 8/1992 | Egawa ........................ 358/224 |
| 5,142,310 A | * | 8/1992 | Taniguchi et al. ........... 354/106 |
| 5,184,169 A | * | 2/1993 | Nishitani .................... 354/412 |
| 5,467,198 A | * | 11/1995 | Aosaki et al. .............. 358/400 |
| 5,477,353 A | * | 12/1995 | Yamasaki ................... 358/527 |
| 5,502,486 A | * | 3/1996 | Ueda et al. ................. 348/239 |
| 5,515,101 A | * | 5/1996 | Yoshida ...................... 348/239 |
| 5,666,215 A | * | 9/1997 | Fredlund et al. ............ 358/527 |
| 5,666,578 A | * | 9/1997 | Oikawa et al. ............. 396/319 |
| 5,696,576 A | * | 12/1997 | Itoh et al. ..................... 355/40 |
| 5,799,219 A | * | 8/1998 | Moghadam et al. ........ 358/527 |
| 5,838,457 A | * | 11/1998 | Umemoto .................... 358/527 |
| 5,966,553 A | * | 10/1999 | Nishitani et al. ........... 396/303 |
| 5,978,016 A | * | 11/1999 | Lourette et al. ............. 348/64 |
| 6,396,537 B1 | * | 5/2002 | Squilla et al. .............. 348/239 |

* cited by examiner

Primary Examiner—Madeleine Nguyen
(74) Attorney, Agent, or Firm—Sughrue Mion, PLLC

(57) ABSTRACT

An image of a picture frame photographed on a photo film is displayed on a screen of an image input device, or is printed out as a hard copy. A graphic image is written by a user in the image of the picture frame, and graphic data of the graphic image is detected from the image of the picture frame having the graphic image written therein. The graphic data is associated with the picture frame, and is transferred from the user to a photofinisher through electronic transmission, or is recorded on a data recording medium which is forwarded to the photofinisher along with the photo film. A synthetic print containing the picture frame and the graphic image is made from the picture frame and the graphic data.

13 Claims, 24 Drawing Sheets

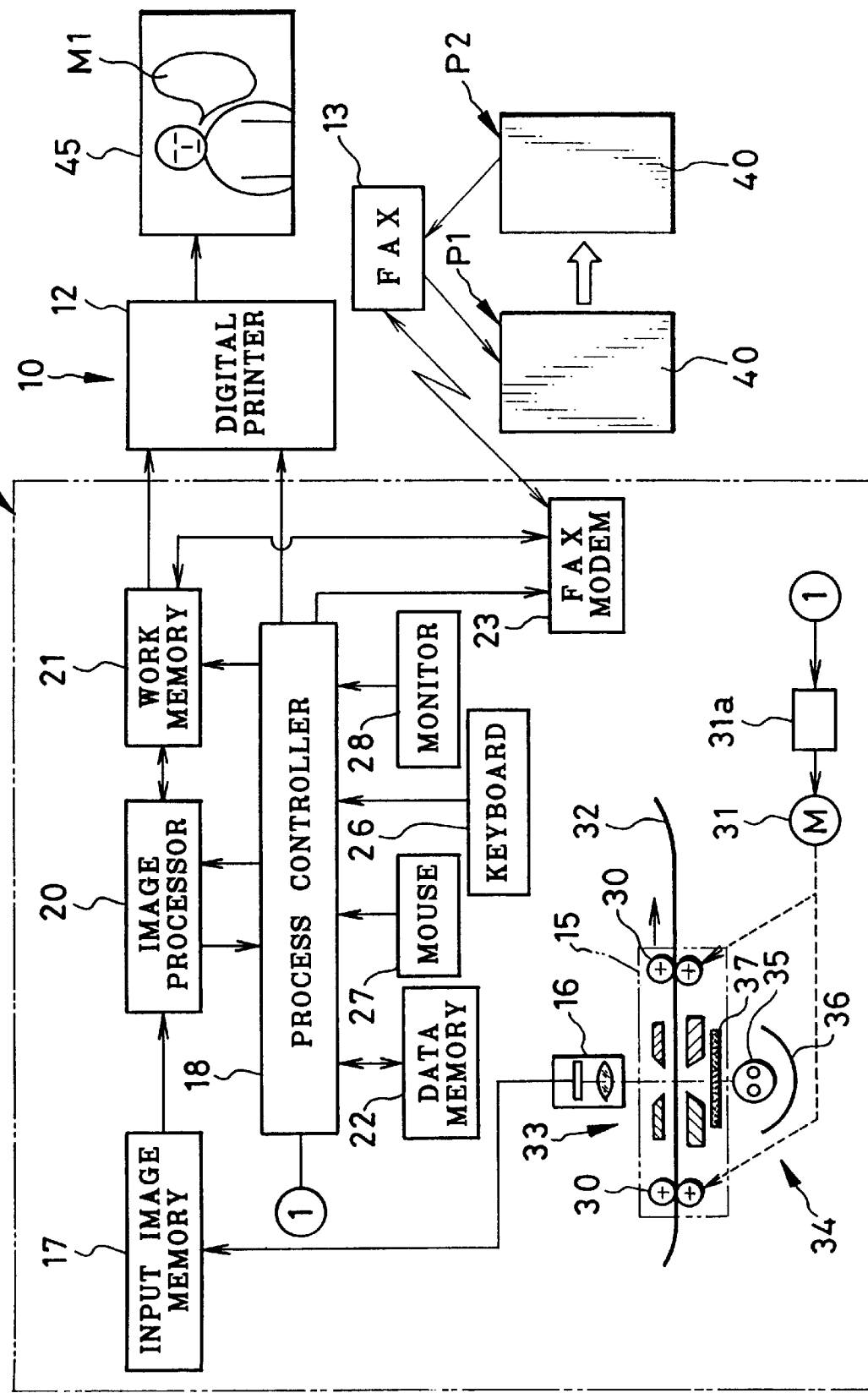

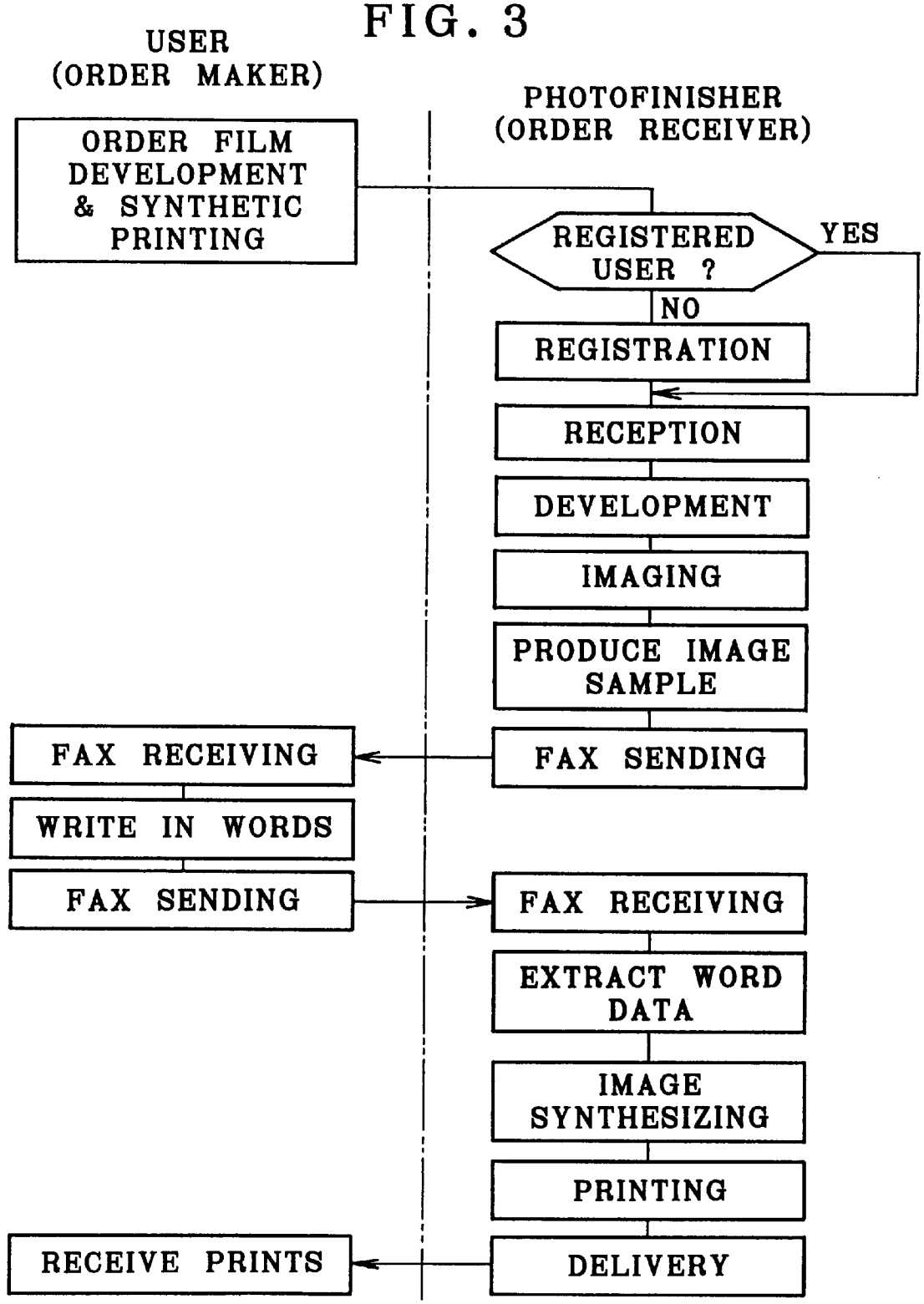

FIG. 19A	FIG. 19B
 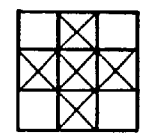
FIG. 20A	FIG. 20B
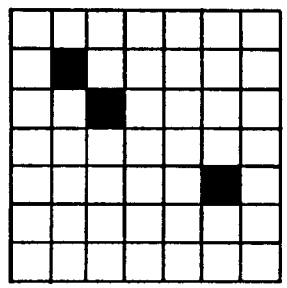  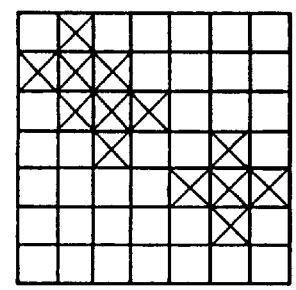
FIG. 22A	FIG. 22B
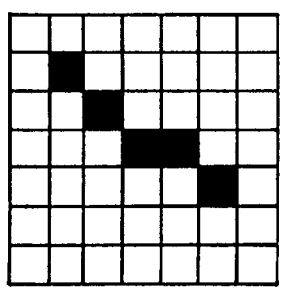  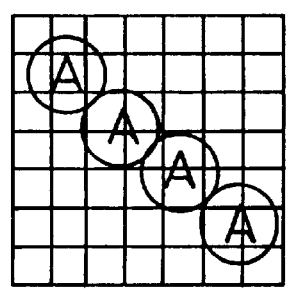

FIG. 31

| COMMAND SET NUMBER | S1 | S2 | S3 | S4 |
|---|---|---|---|---|
| CONTENT OF COMMAND | PASTE | PASTE | PASTE | RELOCATE |
| IMAGE SOURCE | FRAME NO.1 | FRAME NO.2 | FRAME NO.3 | LOCATION 2 |
| PROCESS RESULT | LOCATION 1 | LOCATION 2 | LOCATION 3 | LOCATION 4 |
| SUPPLEMENTAL DATA | AREA DATA FILE FA1 | AREA DATA FILE FA2 | AREA DATA FILE FA3 | COURSE DATA FILE FB1 |
| DISPLAY TIME DURATION | t1 | t2 | t3 | t4 |

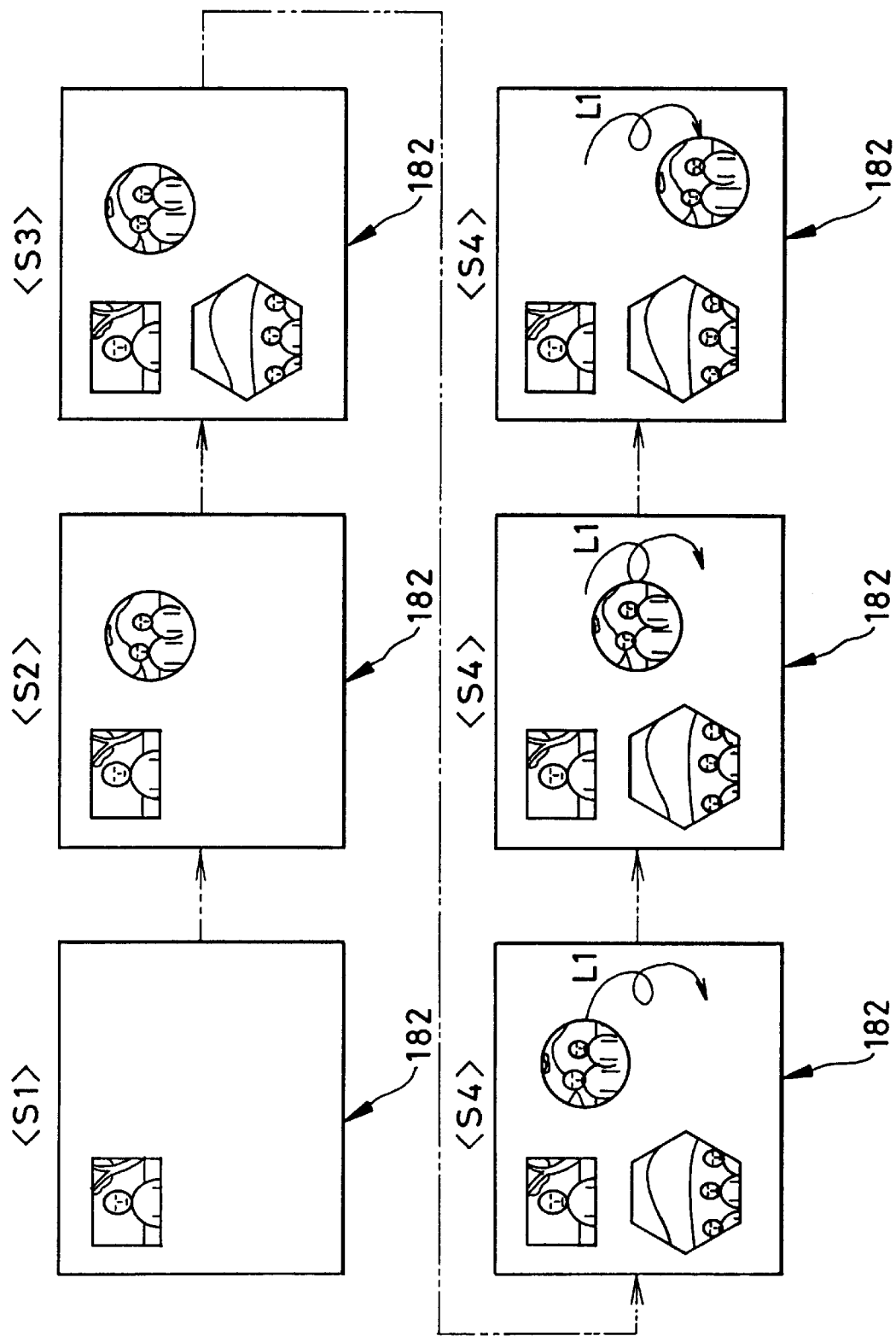

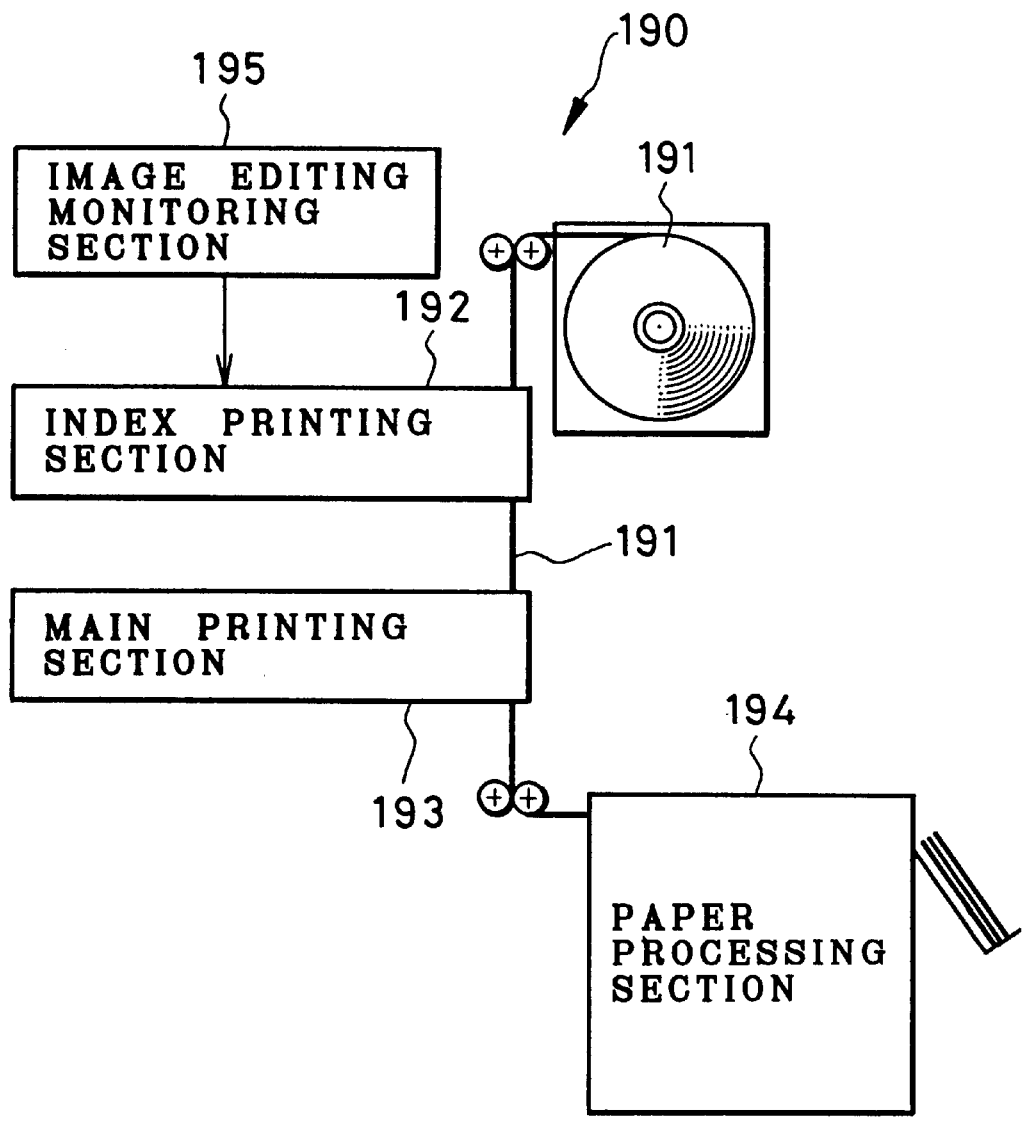

PRINTING METHOD AND SYSTEM FOR MAKING A PRINT FROM A PHOTO PICTURE FRAME AND A GRAPHIC IMAGE WRITTEN BY A USER

BACKGROUND OF THE INVENTION

1. Field of the Invention

The present invention relates to a printing method and system for making a print from a photo picture frame and a graphic image written by a user, such as characters and drawings written by hand or a tough pen or the like, or input through a keyboard, an image input terminal, a character recognition device, or the like. The present invention relates also to a method of editing photo picture frames on a screen, and an apparatus therefor.

2. Background Arts

A new type of photo film, called IX 240 type, has been developed and brought into market. The IX 240 type photo film has a transparent magnetic recording layer thereon, so it is possible to record data on or read data from the magnetic recording layer by a magnetic recording device or a magnetic reading device, which may be incorporated into a camera, a film scanner, a photo printer, or a photographic image reproduction device called a photo player.

The data recorded for each picture frame by the camera may include the frame serial number, the date and time of photography, the exposure value used for the picture frame, the kind of light source, the requisite number of prints, the print format like panoramic size, high-vision size or conventional 35 mm film frame size. The printer controls the print-exposure value, the number of prints made from each picture frame, and the print format based on the data read from the magnetic recording layer.

It has also been suggested to record data of titles, messages, notes, or greetings, which are given by the photographer to selected picture frames, on the magnetic recording layer in association with the selected picture frame, so the printer prints the title, note or message in combination with the picture frame.

However, it has been difficult to input and record data of appropriate words through a camera. Therefore, the photographer is only allowed to choose one of options prepared in the camera, like "A Happy New Year", "Graduation Ceremony", and the chosen title or message is recorded in the form of a code. Besides, the photographer cannot freely choose the position of the words relative to the picture frame, but is allowed to choose among several predetermined locations inside, outside and backside the printed picture frame.

In the conventional cameras, the photographer cannot design the font or style of the merge-printed or superimposed characters. It is also impossible for the photographer to enter data of handwritten characters or drawings to synthesize them with the photographed picture frame.

Even though IX 240 photo film has the magnetic recording layer, cheap compact cameras and lens-fitted photographic film units are not provided with the magnetic recording device for the magnetic recording layer.

SUMMARY OF THE INVENTION

In view of the foregoing, an object of the present invention is to provide a printing method and system which allows making a print from a photo picture frame and a graphic image written by the user, including characters and drawings, without the need for recording data on the magnetic recording layer of the photo film or other data recording medium by the camera.

Another object of the present invention is to provide a printing method which allows the user to add any image, including characters, drawings, and a still video image, to an image of a photo picture frame at an appropriate position in an appropriate style.

To achieve the above object, the present invention provides a printing method for making a print from a picture frame photographed on a photo film and a graphic image written by a user, the method is comprised of the following steps: picking up image data of the picture frame after the photo film is developed; making an image sample of the picture frame based on the image data of the picture frame; writing the graphic image in the image sample at an appropriate position; detecting graphic data of the graphic image from the image sample having the graphic image written therein, the graphic data including a position of the graphic image relative to the picture frame; and making a print based on the picture frame and the graphic data, the print containing the graphic image at the position designated by the graphic data.

According to the present invention, a printing system for making a print from a picture frame photographed on a photo film and a graphic image written by a user, is comprised of imaging means for picking image data of the picture frame after the photo film is developed; image sample making means for making an image sample of the picture frame based on the image data of the picture frame, the image sample making means installed in a photofinisher; electronic transmission means for sending the image sample from the photofinisher to the user and for sending the image sample having the graphic image written therein from the user back to the photofinisher; detection means for detecting graphic data of the graphic image from the image sample having the graphic image written therein, the graphic data including a position of the graphic image relative to the picture frame, the detection means being installed in the photofinisher; and printing means for making a print based on the picture frame and the graphic data, the print containing the graphic image at the position designated by the graphic data.

According to a preferred embodiment, the electronic transmission means is facsimile, and the graphic image is written by hand on a hard copy printed out through the facsimile.

The present invention also provides a printing method for making a print from a picture frame photographed on a photo film and an image added by a user, the method is comprised of the following steps: inputting ID data of the picture frame in a data communication terminal; inputting image data of the image to add in the data communication terminal; storing the input image data of the image in association with the ID data of the picture frame as a data file in the data communication terminal; transferring the data file from the data communication terminal to a data processing device installed in a photofinisher, as the photo film is forwarded to the photofinisher for printing; and making a print containing the added image and the picture frame based on the picture frame and the data file.

Another printing method of the present invention for making a print from a picture frame photographed on a photo film and an image added by a user, is comprised of the following steps: inputting image data of the image to add in a data communication terminal; transferring the input image data from the data communication terminal to a data recording device; recording the input image data on a data recording medium by the data recording device in association with the picture frame; and making a print containing the picture frame and the added image from the picture frame and the input image data read out from the data recording medium.

The data recording medium is preferably a magnetic recording layer of the photo film, while the data recording device is a magnetic recording device which is incorporated into a camera or into a photographic image reproduction device. The photographic image reproduction device picks up image data of the picture frame from the photo film after being developed, and displays an image of the picture frame.

Another printing method of the present invention for making a print from a picture frame photographed on a photo film and a graphic image written by a user is comprised of the following steps: inputting graphic data of the graphic image through an image input device; inputting edit command data for designating printing style of the graphic image on the print; recording the graphic data and the edit command data on a data recording medium in association with the picture frame; reading the graphic data and the edit command data from the data recording medium; modifying the graphic data with the edit command data; and making a print containing the picture frame and the graphic image in the designated printing style, based on the picture frame and the modified graphic data.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein:

FIG. 1 is a block diagram illustrating a synthetic printing system according to an embodiment of the invention;

FIG. 3 is a flow chart illustrating a method of ordering and making synthetic prints that uses the synthetic printing system of FIG. 1;

FIGS. 19A and 19B are explanatory views illustrating one pixel of the graphic image and an ornamental pattern corresponding to the one pixel;

FIGS. 20A and 20B are explanatory views illustrating a portion of a graphic image and a corresponding portion of a modified image obtained by converting each pixel into the ornamental pattern of FIG. 19B;

FIGS. 22A and 22B are explanatory views illustrating a portion of a graphic image and a corresponding portion of a modified image obtained by converting each pixel into another ornamental pattern;

FIG. 31 is a table diagram illustrating an example of edit data stored in an edit memory of the image editing monitoring apparatus of FIG. 28;

FIG. 33 is an explanatory view illustrating an example of time-sequential display of several edition processes on a pasteboard area in a monitor mode; and FIG. 34 is a schematic diagram illustrating a printer-processor applicable to making a hard copy of an image of the pasteboard area.

DETAILED DESCRIPTION OF THE PREFERRED EMBODIMENT

Figure 2B:
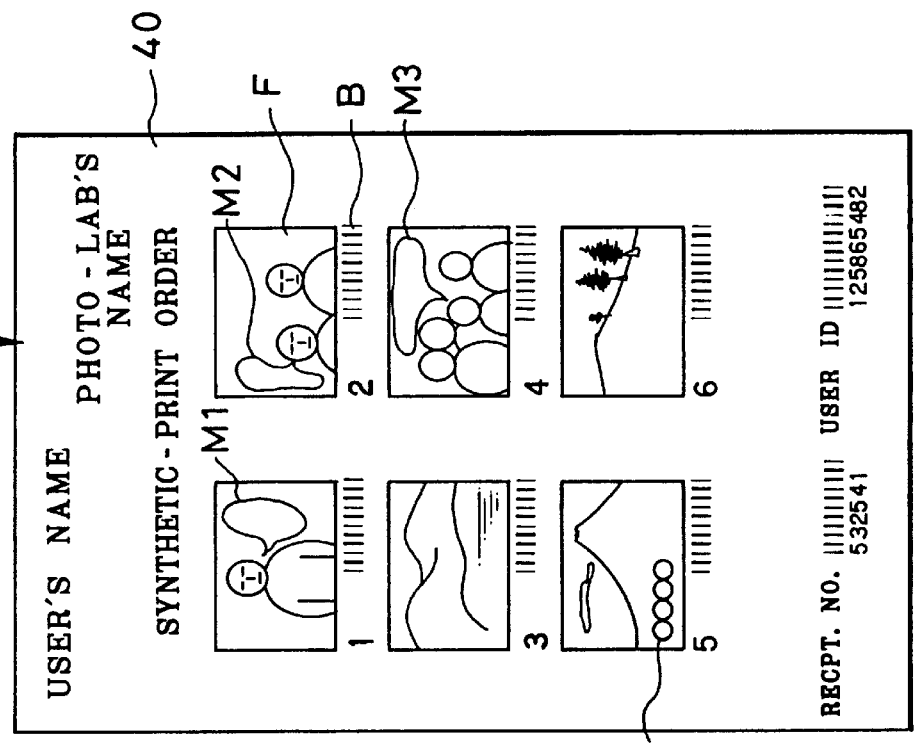
FIGS. 2A and 2B are plan views illustrating an example of synthetic-print ordering form used in the synthetic printing system of FIG. 1, before and after being filled with words to synthesize.

FIG. 1 shows a synthetic printing system 10 constituted of a film scanner 11 and a digital printer 12, which are installed in a photo-lab of a photofinisher, and of a facsimile device (FAX) 13 installed in a user that orders printing to the photofinisher. The film scanner 11 is constituted of a film carrier 15, an imaging section 16, an input image memory 17, a process controller 18, an image processor 20, a work memory 21, a data memory, and a fax modem 23.

The film carrier 15 consists of several pairs of film feed rollers 30 and a motor 31 for rotating the feed rollers 30. The motor 31 is driven by a process controller 18 through a driver 31a to feed a developed photo film 32 successively to an imaging stage 33. The imaging section 16 is disposed above the imaging stage 33, whereas a light source section 34 is disposed below the imaging stage 33. The light source section 34 consists of a fluorescent light tube 35 emitting light with a suitable properties for the photo film 32, a reflector 36 and a diffusion plate 37. The imaging section 16 consists of a lens and a line image sensor. The imaging section 16 scans the image of each picture frame on the photo film 32 synchronously with the film feeding, and detects three color separated image data. The image data is written in the input image memory 17.

The image processor 20 extracts those image data pieces belonging to the individual picture frame from the image data written in the input image memory 17. Specifically, the image processor 20 detects an edge of one picture frame and determines one image area based on the detected edge and a predetermined film feeding length for one picture frame. Then, the image processor 20 sorts out the image data pieces contained in the image area. Thereafter, the image processor 20 processes the image data pieces to correct gradation, density and color balance. If the photo film 32 is a negative film, the image processor 20 conducts a negative-to-positive conversion.

The image processor 20 also produces image samples to be made from the picture frames on the photo film 32. The process controller 18 sends data of the image samples through the fax modem 23 to the FAX 13, so the FAX 13 prints out a hard copy P1 of the image samples F. As shown for example in FIG. 2A, the image samples F of six picture frames are printed as black-and-white half-tone images on a A4-size sheet 40. When the photo film 32 is a 24-exposure filmstrip, four sheets 40 containing six image samples F each are printed out in series from the FAX 13.

The fax number of the user is written on a designated envelope when the photo film 32 is received from the user to the photofinisher or the photofinisher's agency, and is input through a keyboard 26 into the film scanner 11 prior to scanning the photo film 32 of that user. It is alternatively possible to input the fax number into a reception processing device at the photofinisher or the photofinisher's agency, to send the fax number from the reception processing device to the film scanner 11.

Under each image sample F are provided a frame number N and a frame ID bar code B. The frame ID bar code B is composed of a reception number and the frame number of each picture frame. The reception number is given to each individual photo film 32 upon receipt of the photo film 32 to the photofinisher or the photofinisher's agency. The reception number and its bar code are printed on a label, and the label is put on a not-shown designated envelope for the photo film 32 as well as on the photo film 32. Below the six image samples F are printed a user ID number 41 and its bar code 42 as well as a reception number 43 and its bar code 44, wherein the reception number 43 is identical to the reception number of the photo film 32. The user uses each sheet 40 containing the image samples F and their related data as a synthetic-print ordering form P1.

Figure 2A:
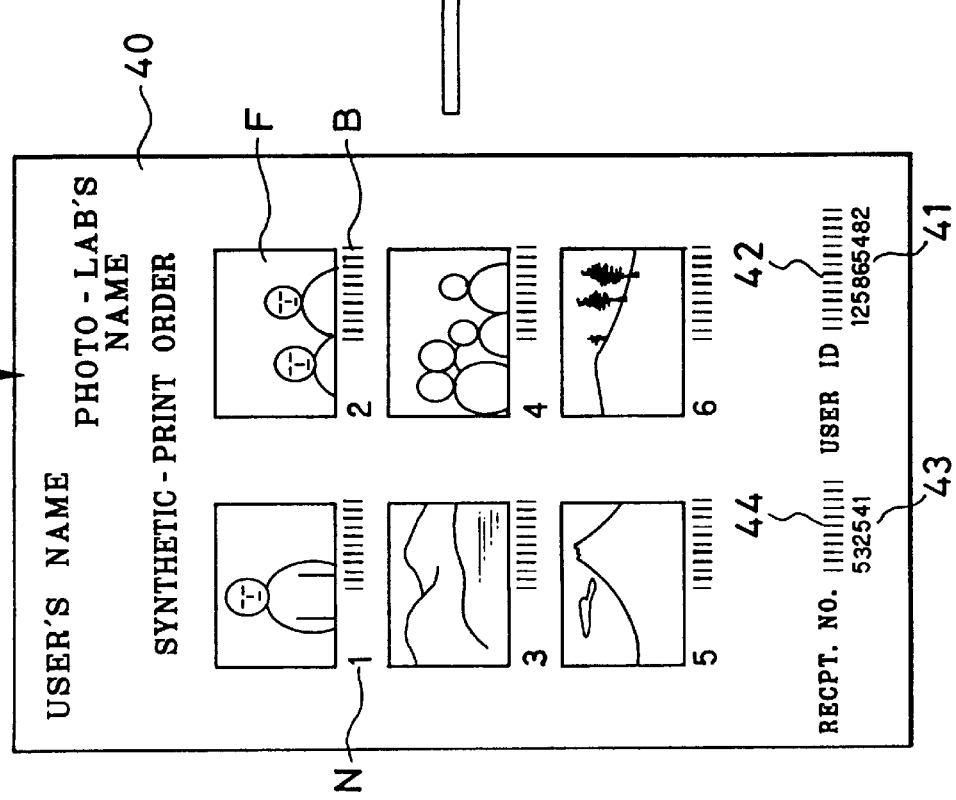

As shown in FIG. 2B, the user can handwrite words M1 to M4 directly in the image samples F of desired picture frames on the synthetic-print ordering form P1 in appropriate styles. A synthetic-print ordering form filled with the words M1 to M4 will be hereinafter referred to as the synthetic-print ordering paper P2. Thereafter, the user sends the synthetic-print ordering paper P2 back to the photofinisher through the FAX 13. The content of the synthetic-print ordering paper P2 is converted into image data through a fax modem 23, and is sent to the image processor 20.

The image processor 20 compares the content of the synthetic-print ordering paper 2 with the content of the corresponding synthetic-print ordering form P1, to extract data of the words M1 to M4 written by the user, including the position within the picture frame and the density of pixels constituting the words M1 to M4. Thereafter, the image processor 20 treats the data of the words M1 to M4 with necessary processing steps for compounding or synthesizing it with the image data, such as resolution matching, noise reduction, smoothing, color conversion into designated colors. Character image data obtained through these processes is then synthesized with the image data of the designated picture frames. The synthetic image data is sent to the digital printer 12.

The process controller 18 is a microcomputer which controls the respective elements of the film scanner 11 in a sequential fashion, to execute the above described operations of the film scanner 11. For this purpose, a mouse 27 and a monitor 28 are also connected to the process controller 18.

Based on the synthetic image data, the digital printer 12 scans a photographic material with a printing light beam to record a synthetic image on the photographic material. The photographic material is heat developed, and the recorded image is transferred to an image receptive sheet, producing a hard copy 45 of the picture frame synthesized with the words. The digital printer 12 is not to be limited to the heat developed transfer printer, but may be a silver-salt photographic printer, an ink-jet printer, an ink transfer thermal printer, a direct thermosensitive printer.

Now the operation sequence of the synthetic printing system 10 will be described with reference to FIG. 3.

First, the user orders the photofinisher to develop a photo film and synthesize words with photographic images. If the user is not registered with the photofinisher, the photofinisher gives a user ID number to the user, and registers the user's name, address, telephone number, fax number and other user data. Thereafter, a reception number is given to the individual photo film by putting a label with the reception number and its bar code onto the photo film 32 and the designated envelope enclosing the photo film. Instead of using the reception number, it is possible to use a serial number in combination with each user ID number, or an ID number that is previously printed on the designated envelope.

The exposed photo film is developed in a conventional manner, and the developed photo film 32 is set in the film scanner 11. The film scanner 11 feeds the photo film 32 continuously through the film carrier 15, and scans the photo film through the imaging section 16 synchronously with the film feeding. The three color image data detected through the imaging section 16 is written for each color in the input image memory 17. The image processor 20 extracts those image data pieces which belong to each picture frame from the three color image data written in the input image memory 17. The image processor 20 produces a black-and-white half-tone image as an image sample from the image data of each picture frame, and composes data of the synthetic-print ordering form P1 containing six image samples F in one sheet. The data of the synthetic-print ordering form P1 is sent to the FAX 13 of the user. If the photo film 32 is 24-exposure type, four sheets of synthetic-print ordering form P1 are printed out through the FAX 13 on A4 size sheets 40.

The user observes the image samples F on the synthetic-print ordering form P1, and writes appropriate words M1 to M4 in the image samples F of desired picture frames. Thus, the synthetic-print ordering paper P2 filled with the words M1 to M4 is sent back to the photofinisher through the FAX 13. The fax modem 23 converts the content of the synthetic-print ordering paper P2 into image data, and sends it to the work memory 21 and the image processor 20.

The image processor 20 extracts the content of the words M1 to M4 as image data by comparing the synthetic-print ordering form P1 with the synthetic-print ordering paper P2. The image processor 20 then determines the position of the words M1 to M4 in the synthetic-print ordering paper P2, and synthesizes the character image data of each unit of the words M1 to M4 with the pictorial image data of the associated picture frame based on the determined position.

The synthetic image data is sent to the digital printer 12, which prints out a hard copy 45 containing the image of the picture frame synthesized with the words M1. A simulation image of the hard copy of the picture frame synthesized with the words M1 may be displayed on the monitor 28 for visual confirmation.

Due to the sending and receiving process through the FAX 13, i.e. the image printing on the sheet 40 and the image reading from the sheet 40, the image quality of the synthetic-print ordering paper P2 gets worse than that of the synthetic-print ordering format P1 at the photofinisher side. Therefore it is desirable to cope with the quality deterioration by use of a density reference chart, by limiting the density range, and/or by taking an edge imaging method or the like.

Figure 4:
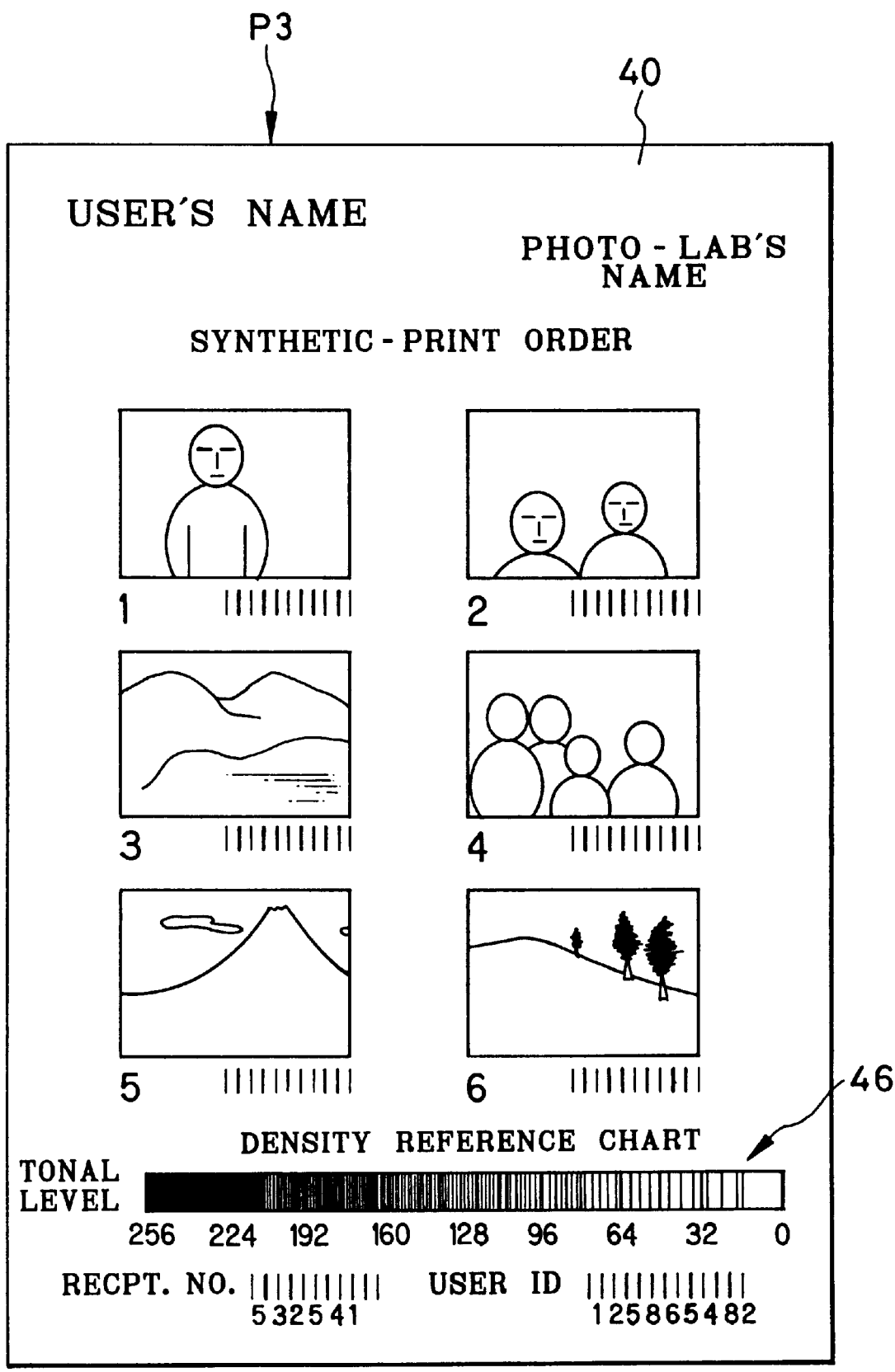
FIG. 4 is a plan view illustrating another example of synthetic-print ordering form used in the synthetic printing system of FIG. 1.

FIG. 4 shows an example of using a density reference chart, wherein a gray scale 46 is sent as a density reference chart together with a synthetic-print ordering form P3. The gray scale 46 consists of 256 tonal levels ranging from 0 to 255. The photofinisher compares the gray scale 46 on a synthetic-print ordering paper corresponding the synthetic-print ordering form P3 as received from the user, with the original gray scale 46, to determine the quality deterioration characteristics. The photofinisher then determines correction amounts for compensating for the deterioration. Thereby, the deterioration is mostly corrected.

Limiting the density range is to limit the maximum density level of the sending images to be lower than the maximum density given by the density resolution power of the FAX 13 on the user side. In that case, the user is required to write the words in the received ordering form by use of black ink. As the words written by the black ink constitute the maximum density portions on the ordering paper, it is easy to extract the words from the image data received from the user through the FAX 13 and the fax modem 23.

According to the edge imaging method, the sending images are subjected to an edge extraction process, binarizing and thinning. Thereby, the edges or the contour of the images are provided as image samples of the respective picture frames. The user can write the words into the image samples even if the image samples only schematically show the scenes of the respective picture frames. The photofinisher receives binarized image data consisting of the synthesized words and the contour of the scene from the user, and extracts the synthesized words based on the difference between the received image data and the sent image data. If some characters of the synthesized words overlap or cross the scene contour, pixels of the overlapped part are subjected to a dilation and erosion process to recover the continuity of the synthesized words.

When the density resolution power of the FAX 13 is large enough, it is unnecessary to binarize the image data. Furthermore, it is possible to select appropriate one or more of the above compensation methods according to the density resolution power of the FAX 13. For example, the photofinisher initially checks the density resolution power of the FAX 13 of one user by use of the synthetic-print ordering form P3 with the density reference chart 46, and memorizes the density resolution power with the user's address, name, fax number, and other user-related data in the form of a data base. Thereafter, based on the density resolution power retrieved from the data base, an optimum method is selected for each FAX 13.

In a case where the FAX 13 can only print out a hard copy on a sheet of a different size, e.g. B5 or B4, from the original size, i.e. A4 size, the subsequent synthetic-print ordering paper will be sent back to the photofinisher in the different size from the original. In order to ensure extracting the synthesized words even on the different size sheets, it is necessary to correlate the respective picture frames by use of the frame number bar codes B, and adjust the positions of the picture frames by use of frame marks. The frame borders bounding the respective picture frames are printed in different sizes, so it is possible to determine the print magnification rate with reference to the frame borders. Based on the determined print magnification rate, each received image sample is enlarged or reduced to adjust to the size of the originally sent image samples.

It is possible to provide a blank in the synthetic-print ordering form for writing other orders therein. For example, the blank includes a reprinting order cell, a trimming order cell, a main subject designating cell, and so forth. In the reprinting order cell, the user can write the numbers of the picture frames to reprint, the requisite number of prints to be made from the individual picture frame. The trimming order cell is for writing a trimming order. In addition, a trimming frame is written on the image sample of the picture frame to trim. The main subject designating cell is for designating the main subject within a scene. A main subject is designated by circling it on the image sample of the picture frame concerned. Thereby, the photofinisher can finish the print so as to make the designated main subject optimum. It is possible to designate color and line width of characters of the synthetic-print.

Figure 5:
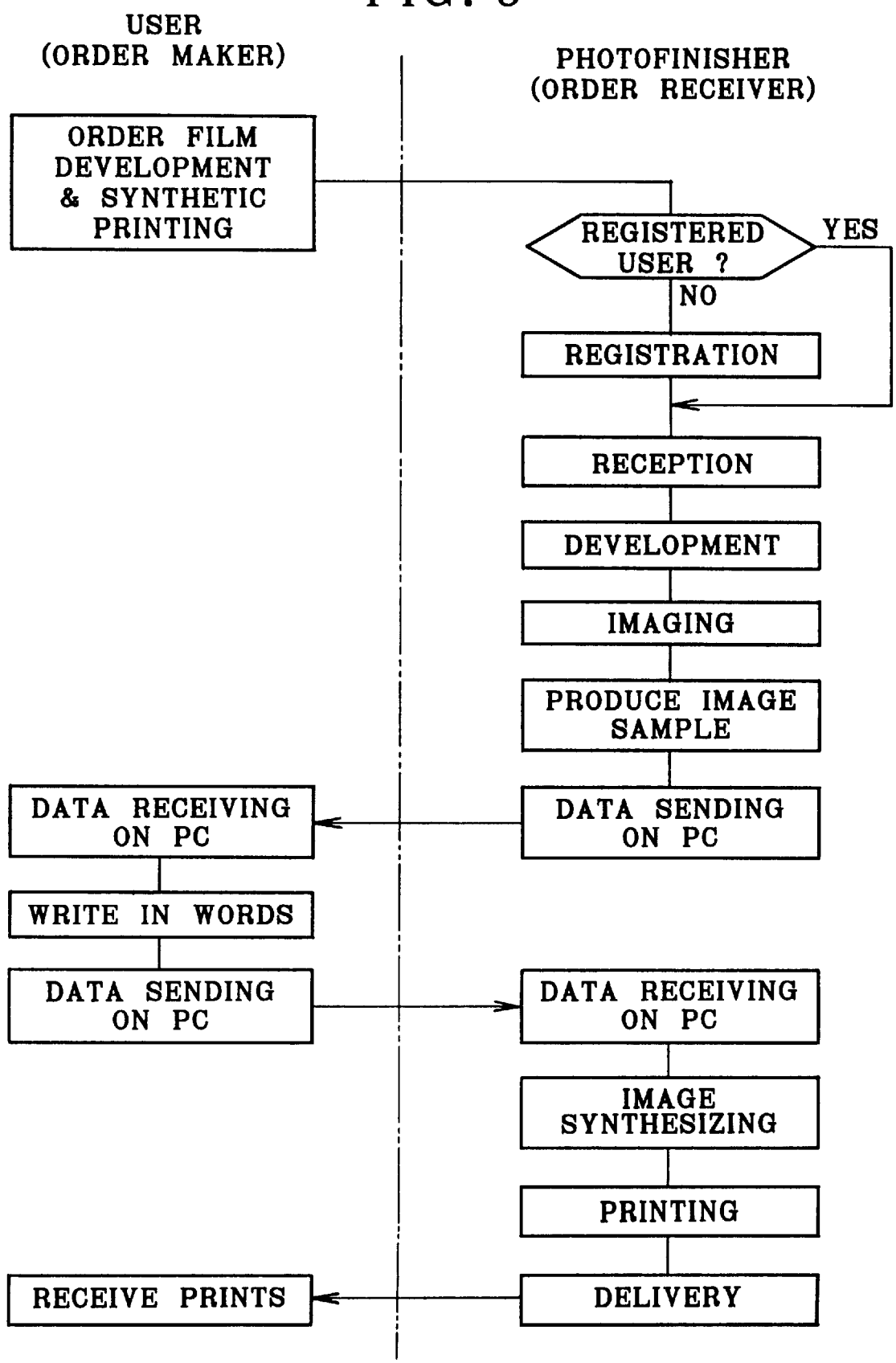
FIG. 5 is a flow chart illustrating another method of ordering and making synthetic prints that uses personal computers instead of facsimile apparatuses.

According to the above embodiment, the synthetic-print ordering form P1 and the synthetic-print ordering paper P2 are faxed through the FAX 13 between the photofinisher and the user. But it is also possible to send the synthetic-print ordering form and paper through personal computers (PC), as shown in FIG. 5. In that case, the synthetic-print ordering form P1 is displayed on the display device of the personal computer, and the words to synthesize are written on the displayed image through a keyboard, a mouse, a light pen, or the like. Data of the written words are transferred to the photofinisher along with data of the frame borders and the bar code of each image sample. In this case, the photofinisher does not need to extract the words from the image data based on the difference between the data sent to the user and the data received from the user, so that data communication for the synthetic-printing between the user and the photofinisher will be more simplified.

It is possible to make a hard copy of the synthetic-print ordering form through a printer that is connected to the personal computer, and write the words on the hard copy of the ordering form. In that case, the hard copy of the ordering form filled with the words, i.e. the synthetic-print ordering paper, is scanned through an image scanner that is connected to the personal computer, so the scanned data of the synthetic-print ordering paper is transferred to the photofinisher. The photofinisher extracts data of the words from the received data based on the difference between the originally sent data and the received data.

Instead of extracting the data of the words, it is possible to send only the data of the words to the photofinisher. In that case, the frame number and frame borderlines of each picture frame are displayed on the display device of the personal computer, to permit writing the words inside the frame borderlines. It is also possible to write the words in a particular color different from black, scan the ordering paper by a color scanner, and extract data of the words by designating the particular color. Thereafter, the extracted data of the words is sent to the photofinisher along with data of the frame borderlines and the frame number bar code of the associated picture frame.

Figure 6:
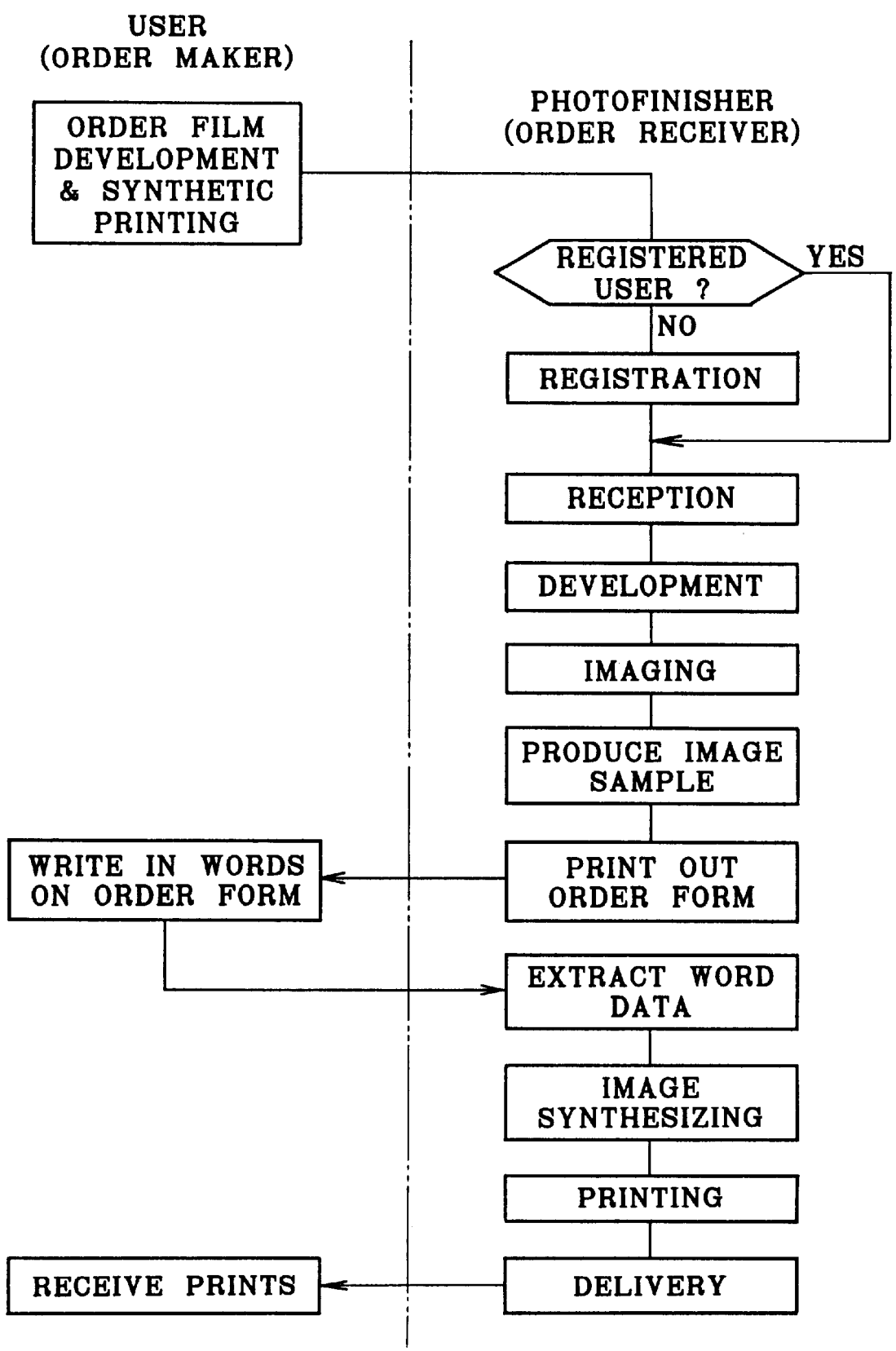
FIG. 6 is a flow chart illustrating another method of ordering and making synthetic prints.

The user can write in the words to synthesize on the synthetic-print ordering form that is printed out through a printer installed in the photofinisher or the photofinisher's agency, as shown in FIG. 6. The user can also enter the words on the personal computer at the photofinisher by use of a mouse, a light pen, or the like.

When writing in the words on the synthetic-print ordering form, the image samples on the ordering form are preferably constituted of line drawings produced through edge extraction of the images. In that case, it is desirable to prepare an index print containing reduced images of all picture frames taken on one filmstrip so the user may refer to the index print when writing the words in the image samples consisting of line drawings.

In the above embodiment, each synthetic-print ordering form is printed out on a A4 size sheet, and contains six image samples. But the size of the ordering form and the number of image samples may vary appropriately.

The photo film 32 can be ISO 135 type or IX 240 type, or any other type. Since the IX 240 type photo filmstrip is previously provided with a film ID number each, it is unnecessary to give a new one to the filmstrip at the time of reception. In addition, it is possible to record the data of the words to synthesize on the magnetic recording layer of the IX 240 type photo filmstrip. The data on the magnetic recording layer can be used for reproducing the image synthesized with the words at the reprinting or on a photo player that displays the image based on image data picked up from the photo filmstrip.

Although the above embodiment has been described with respect to those cases where words are synthesized with photographic images, the synthetic printing system of the present invention is applicable to synthesizing any graphic image written by the user, illustrations and drawings, with the photographic image in the same way as for the words.

Although the above embodiment uses the digital printer 12 alone, it is possible, for those picture frames having no additional image, to synthesize to use a conventional photo printer which records a picture frame at one exposure.

Figure 7:
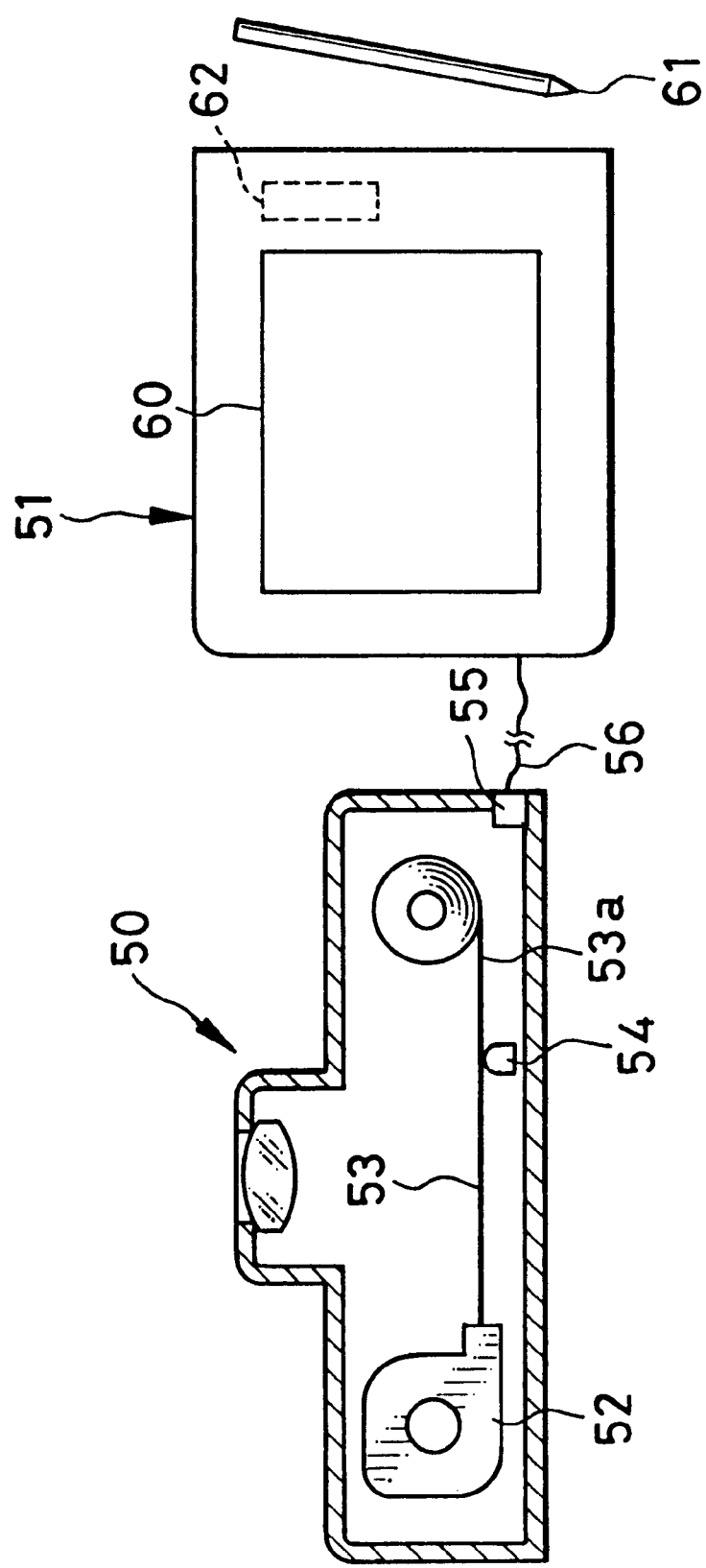
FIG. 7 is a schematic diagram illustrating a data input system for inputting data of a graphic image to synthesize with a photographic image, according to an embodiment of the invention.

FIG. 7 shows a data input system for inputting data of a graphic image to synthesize with a photographic image photographed by a camera, according to an embodiment of the invention. The graphic image may be characters, illustrations, or drawings. The data input system consists of the camera 50 and a data communication terminal apparatus 51. Hereinafter, the data communication terminal apparatus 51 will be simply called the data terminal. In this embodiment, the camera 50 is designed for use with an IX 240 type photo film cartridge 52. The camera 50 has a device for recording photo data on the transparent magnetic recording layer 53a of a photo filmstrip 53 of IX 240 type through a magnetic head 54. The camera 50 also has a device for sending data of a film ID number of the loaded filmstrip 53 and a frame serial number of each picture frame as soon as it is photographed to an external apparatus through a connector 55 and a connection cord 56. In this embodiment, the film ID number is a cartridge ID number recorded on a label on the film cartridge 52, which is read by a reading device provided in the camera 50.

As shown in FIG. 7, the data terminal 51 is an electronic pocketbook with an LCD 60 and a touch pen 61. The data terminal 51 functions as a calendar, a memo book, and an address book like a conventional electronic pocketbook. The data terminal 51 also functions as a data communication device for communicating data with other data terminals such as other electronic pocketbooks and personal computers, and with the camera 50 of the present invention as well. However, the data terminal 51 is not limited to the electronic pocketbook, but may be any other apparatus having a data input device such as a touch pen, a touch panel sensor, a light pen, a keyboard or the like.

Figure 8:
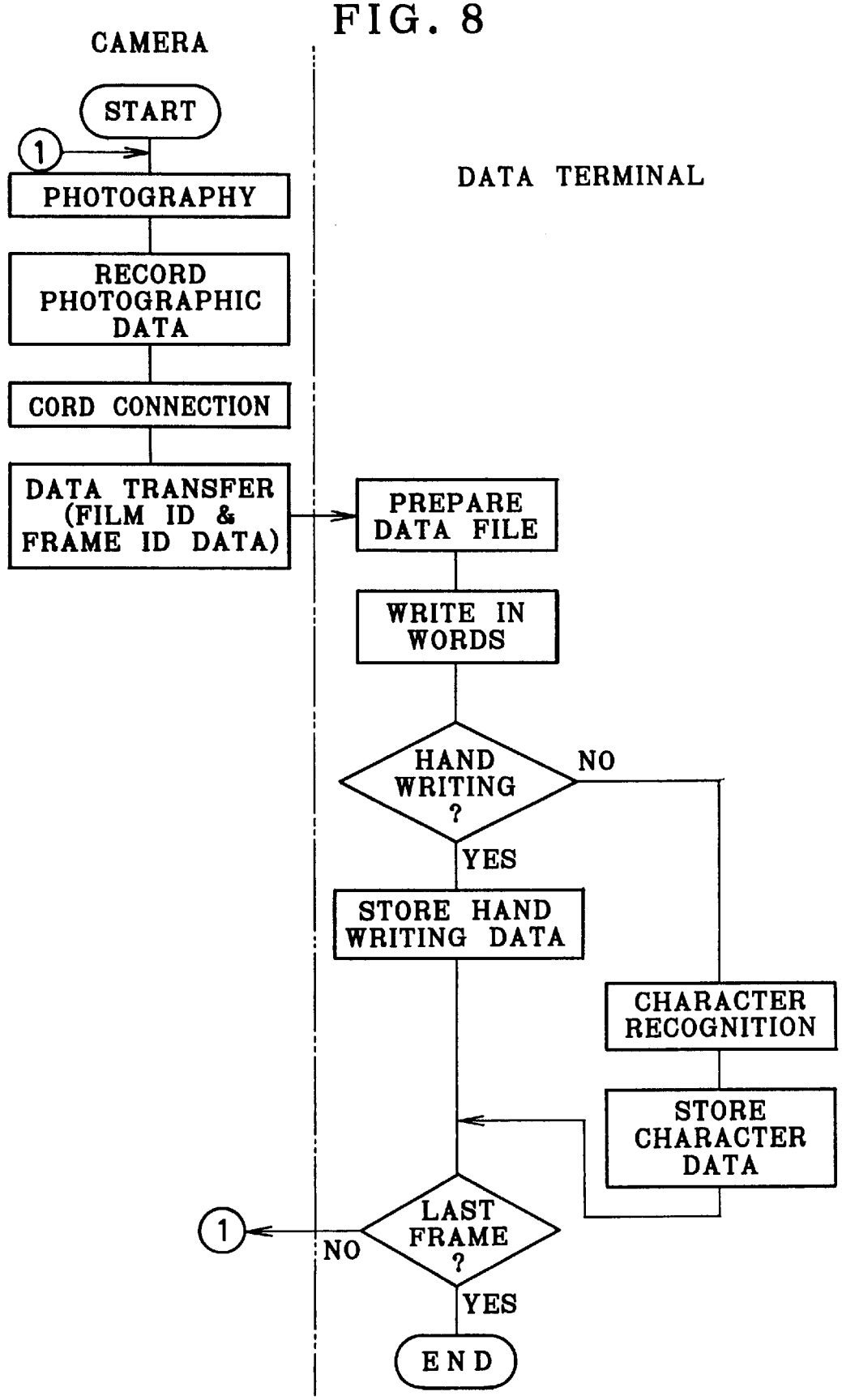
FIG. 8 is a flow chart illustrating a method of inputting and synthesizing words as a graphic image with a photographic image using the data input system of FIG. 7.

As shown in FIG. 8, each time a picture frame is photographed by the camera 50, data of the photography date and time, data for improving the quality of print, data of the requisite number of prints, data of print type, and other various data is recorded on the magnetic recording layer 53a. Concurrently, the number of photographed picture frames is stored in a memory of the camera 50, and is displayed on a display device of the camera 50. It is possible to display the number of still available picture frames in place of the number of photographed picture frames.

Thereafter, the camera 50 is connected to the data terminal 51 through the connection cord 56. Thereby, the film ID number and the frame serial number of the just photographed picture frame are sent as film ID data and frame ID data to the data terminal 51.

When the photographer wishes to synthesize words with the image of the picture frame, the words are written in a handwriting area on the LCD 60 by use of the touch pen 61. The user may choose whether to synthesize the handwritten characters of the words directly as they are or after converting into printing types of an appropriate font. When the user chooses the handwritten characters, the words are stored as handwriting data in a memory 62. When the printing types are chosen, character data obtained through a character recognition process is stored in the memory 62.

In the data terminal 51, a data file is prepared for one picture frame. The data file consists of a header section and a data section. The header section consists of file name data, the film ID data and the frame ID data. The file name data is used for identifying each individual data file within the data terminal 51. The data section consists of the handwriting data or the character data. For brevity sake, the handwriting data and the character data will commonly be referred to as word data. If the photographer wishes to synthesize the same words with a plurality of picture frames, frame serial numbers of these picture frames are registered as the frame ID data in the data file.

When the filmstrip 53 is forwarded to a photofinisher for development and printing, the data files are transferred to a memory device installed in the photofinisher. The photofinisher reads out the data files from the memory device, synthesizes the word data with image data of the assigned picture frame to print the picture frame with the words, and makes a synthetic print containing the image of the picture frame combined with the words. Instead of merge-printing the words in the image of the picture frame, it is possible to print the words on the back side of the photo prints. In that case, back-print designation data is recorded in the header section of the corresponding data file. It is alternatively possible to transfer the data file through telephone lines to a photofinisher's data base.

Data communication between the camera 50 and the data terminal 51 may be a cordless type. For example, an infrared transmission, an electronic wave transmission or the like is available.

To apply the data input system to a lens-fitted photo film unit or a cheap camera that has no magnetic recording device, the photographer inputs the word data through the data terminal 51 in association with the frame serial number alone. Thereafter when the exposed film unit or the photo filmstrip exposed in the cheap camera is forwarded to the photofinisher, the film ID data of the concerned filmstrip is added to the data files, and the data files are transferred to the memory device of the photofinisher.

As a cartridge ID number is not readable from the film unit during the photography, a previously registered user ID number may be registered in the data file as a film ID number, or a reception number given at the time of print order reception may be used as a film ID number. The user ID number or the reception may be kept being used as the film ID number throughout the printing, or may be rewritten with the cartridge ID number before the printing as the photo film cartridge is removed from the unit body.

Since the camera 50 records the date and time of photography on the magnetic recording layer of the filmstrip at each photography, it is preferable to record the time when the words are written on the data terminal 51 along with the word data. Thereby, it becomes unnecessary to transfer the film ID data and the frame ID data from the camera 50 to the data terminal 51. The photographer has only to forward the data files together with the photo film cartridge to the photofinisher on the print ordering. The photofinisher correlates each picture frame with the word data whose writing time is later than and nearest to the photography time of the picture frame, when making a synthetic-print.

According to another method of the present invention, the data file is transferred from the data terminal 51 to the camera 50, and the word data is recorded on the magnetic recording layer 53*a* of the filmstrip 53 through the magnetic head 54 in association with the respective picture frames. Word data may be input in the data terminal 51 and transferred to the camera 50 prior to the photography. In that case, the word data is recorded on the magnetic recording layer 53*a* while the filmstrip 53 is advanced by one frame after the photography of one picture frame. It is alternatively possible to record the word data for the respective designated picture frames while the filmstrip 53 is rewound into the cartridge 52 after the completion of all available exposures. In that case, the data terminal 51 prepares the word data in association with each designated picture frame, and transfers it to the camera 50.

Figure 9:
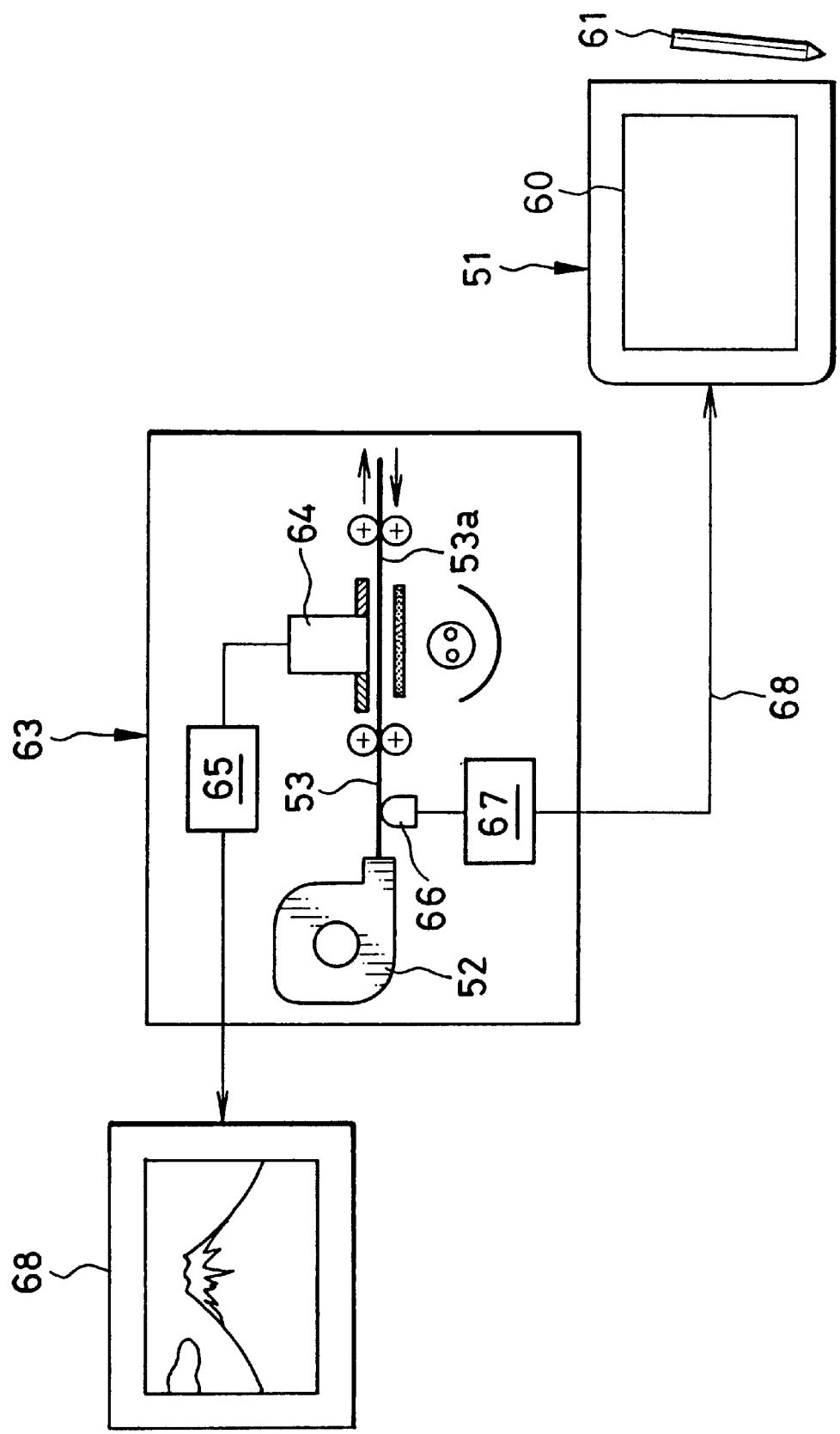
FIG. 9 is a schematic diagram illustrating a data input system using a photo player according to another embodiment of the invention.

Word data may also be input after the development of photo films. FIG. 9 shows a data input system for developed photographic images, wherein a photo film cartridge 52 containing a developed photo filmstrip 53 is set in a conventional photo player 63. The photo player 63 displays each picture frame of the filmstrip 53 on a monitor 68, so the user can input words in the data terminal 51 by writing the words on the LCD 60 by use of the touch pen 61, while observing the monitor 68. The photo player 63 is provided with a scanning section 64 for imaging the respective picture frames of the filmstrip 53, and an image processing section 65 for processing image data from the scanning section 64 to display the individual picture frame on the monitor 68 based on the image data. The photo player 63 is further provided with a magnetic read-write head 66 and a read-write section 67, so the photo player 63 can read the film ID number and the frame serial number from the magnetic recording layer 53*a* of the filmstrip 53. The read-write section 67 sends data of the film ID number and the frame serial number to the data terminal 51 through a connection cord 68. The data terminal 51 produces a data file for one picture frame in the same way as described above. The data files are transferred from the data terminal 51 to the memory device of the photofinisher, so that the photofinisher makes prints synthesized with the words.

Instead of transferring the data files from the data terminal 51 to the memory device of the photofinisher, it is possible to transfer the data files to the photo player 63. Then, the photo player 63 records the word data on the magnetic recording layer 53*a* in association with the designated picture frames through the read-write section 67 and the magnetic read-write head 56. In this case, it is unnecessary to bring the data terminal 51 to the photofinisher.

As a data communication terminal for inputting word data in combination with the photo player 63, a personal computer may be used in place of the data terminal 51. It is also possible to use a film scanner in combination with a personal computer for reproducing images of the picture frames on the developed filmstrip 53, without using the photo player 63. In that case, the user input word data in the personal computer by use of a mouse, a touch pen or the like, while the concerned picture frame is displayed on the personal computer. The word data is recorded on the magnetic recording layer 53*a* of the filmstrip 53 if the film scanner has a magnetic recording device. If not, data files are prepared in the personal computer, and are written in a data recording medium such as a floppy disc. Then, the data recording medium is forwarded to the photofinisher.

According to another embodiment, ID code data is stored in the memory 62 of the data terminal 51 along with each word data assigned to one picture frame. The ID code data has a much shorter length than the word data. Only the ID code data is transferred to the camera 50 or the photo player 63, and is written on the magnetic recording layer 53*a* of the filmstrip 53. Thereafter, the word data and the ID code data is transferred from the data terminal 51 to the memory device of the photofinisher. According to this method, a larger number of words can be synthesized with the photo print compared with the above embodiments where the word data itself is written on the magnetic recording layer 53a of the filmstrip 53 through the camera 50 or the photo player 63.

Figure 10:
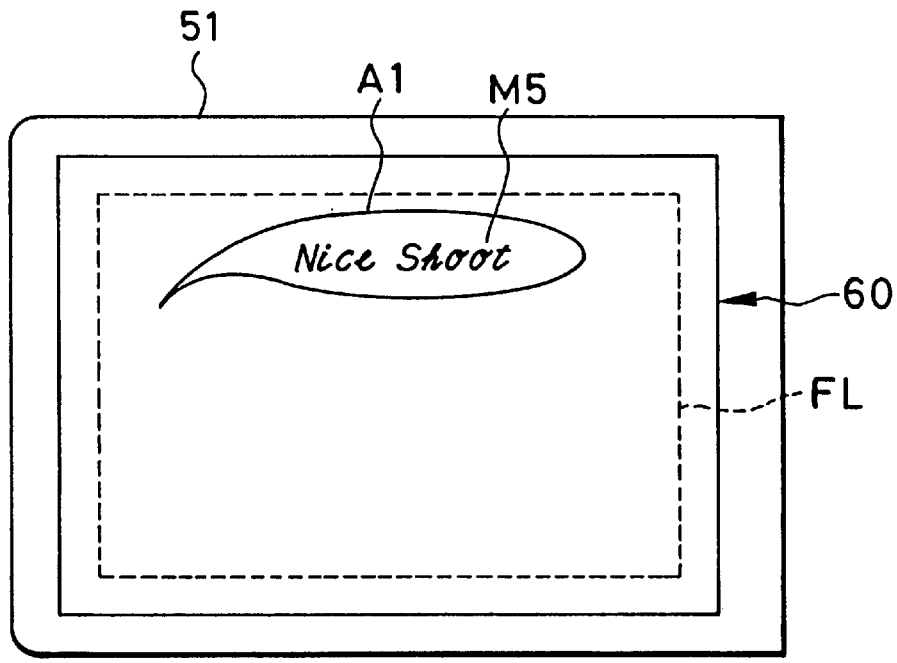
FIG. 10 is an explanatory view illustrating an example of writing words on a data communication terminal apparatus.
Figure 11:
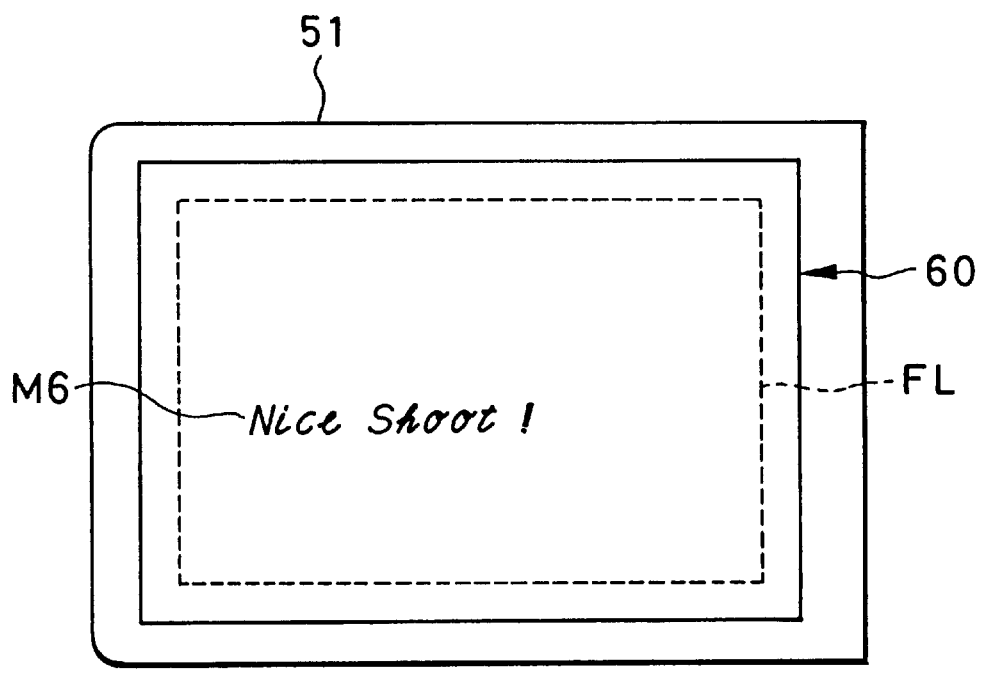
FIG. 11 is an explanatory view illustrating another example of writing words on the data communication terminal apparatus.

In order to designate the merge position of the words in the picture frame, the user may display frame borderlines FL on the LCD 60 of the data terminal 51, draw a balloon Al at an appropriate position inside the borderlines FL, and write the words M5 in the balloon Al by hand, as shown for example in FIG. 10. The words M5 may be synthesized as handwritten characters with the photographed image, or if desired, as printing types of an appropriate font. It is possible to display the words M5 in the designated font. It is also possible to write in words M6 on the LCD 60 at an appropriate position inside the borderlines FL, without drawing a balloon, as shown for example in FIG. 11.

Figure 12:
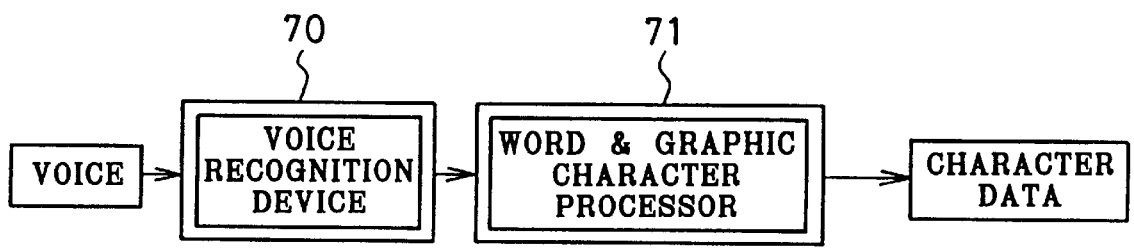
FIG. 12 is a functional block diagram illustrating essential features of a data input system according to another embodiment of the invention.

It is possible to use a voice recognition device as the data terminal for synthesizing words with the photographic image of the picture frame. In that case, the voice recognition device 70 converts the voice into electronic data representative of the meanings expressed by the voice, and the electronic data is converted into character data through a word and graphic character processor 71, as shown in FIG. 12. Thus, the words of the voice are synthesized as graphic characters with the photographic image on a print.

Figure 13:
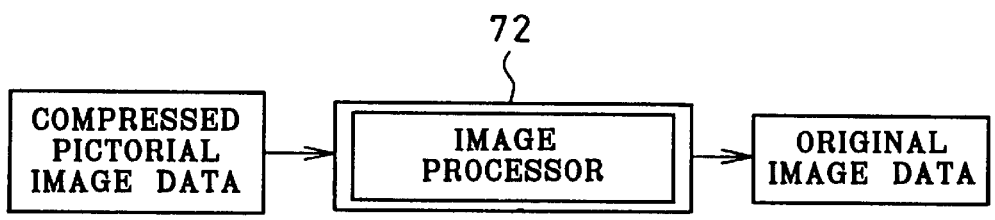
FIG. 13 is a functional block diagram illustrating essential features of a data input system according to a further embodiment of the invention.

It is also possible to synthesize a pictorial image with the photographic image of the picture frame. Image data of the pictorial image to synthesize may be obtained from still image data or movie image data, and the image data is compressed or encoded before being stored in a recording medium or memory, as shown in FIG. 13. The original image data of the pictorial image is reproduced from the compressed image data through an image processor 72, and the original image data is synthesized with the image data of the picture frame, making a synthetic image print.

Figure 14:
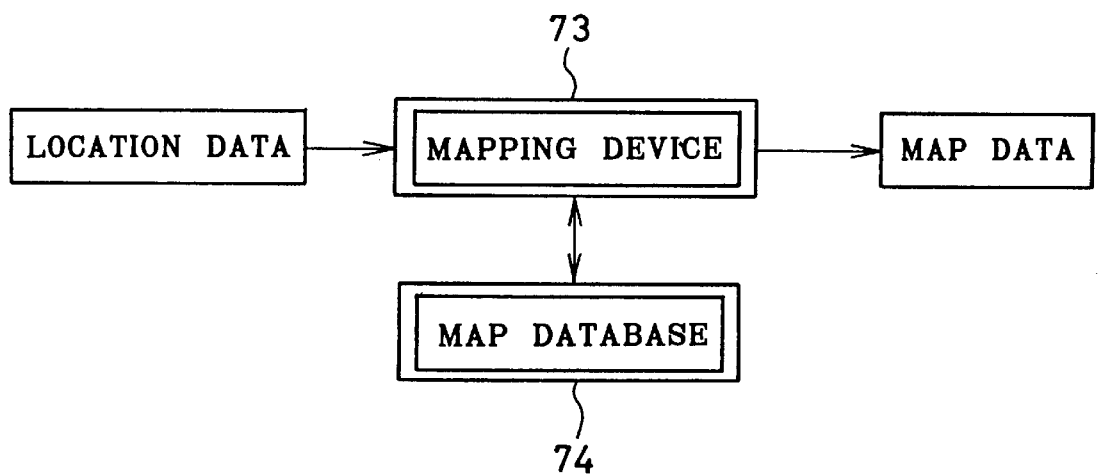
FIG. 14 is a functional block diagram illustrating essential features of a data input system according to still another embodiment of the invention.

According to another embodiment shown in FIG. 14, a data terminal provided with a mapping device 73, which refers to a map database 74 to retrieve map data of a location designated by location data. The location data contains numerical data such as a latitude and a longitude of the location, and/or other data such as the name of the location. The map data is synthesized with image data of a picture frame, so that a map of an area around the designated location is merge-printed with the picture frame. The location data may be obtained through a Global Positioning System (GPS) that allows to determine the present location based on satellite communication signals.

The data input system of the present invention is not limited to the use with IX 240 type filmstrips, but also applicable to ISO 135 type filmstrips or other type photo film having no magnetic recording layer. In that case, the data to synthesize with the image data of the picture frame is written with the frame ID data on a recording medium, and the recording medium is forwarded to the photofinisher, together with the exposed photo film for printing.

Figure 15:
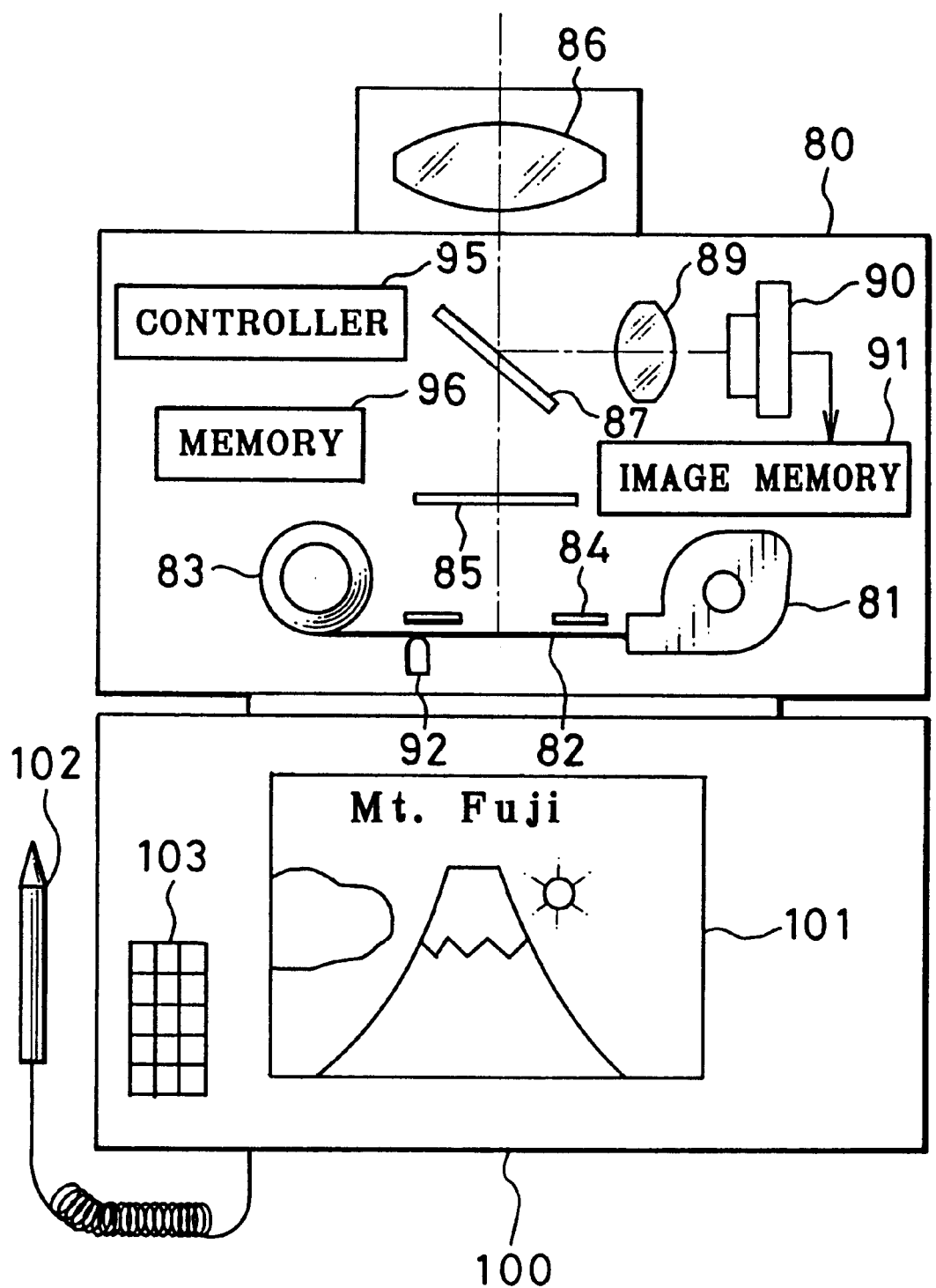
FIG. 15 is a schematic diagram illustrating a camera with a data input device for inputting data of a graphic image to synthesize with a photographic image.

FIG. 15 shows a camera with a data input device for inputting data of an graphic image that the photographer wishes to synthesize with a image photographed by the camera. The graphic image may be characters, illustrations, drawings, or the like. The camera has a camera body 80 for loading an IX 240 type photo film cartridge 81. A photo filmstrip 82 is withdrawn from the photo film cartridge 81 one frame after another, and is wound up onto a take-up spool 83. An exposure aperture 84 is formed between the photo film cartridge 81 and the take-up spool 83.

A shutter 85 opens for a time determined by the subject brightness in response to a shutter release operation. While the shutter 85 opens, light traveling through a taking lens 86 and a half mirror 87 falls onto a film surface of the filmstrip 82 positioned behind the exposure aperture 84. The half mirror 87 may be replaced with a full-reflection mirror that is retracted from a light path of the taking lens 86.

The light reflected from the half mirror 87 is projected through a lens 89 onto a CCD 90, so that a movie image of the photographic field of the taking lens 86 is displayed on a display device 101, e.g. an LCD panel, based on image data obtained through the CCD 90. That is, the display device 101 serves as a viewfinder of the camera during the photography. As soon as the shutter 85 is released, image data from the CCD 90 is written in an image memory 91. Thus, the image data stored in the image memory 91 represents the same image as the latest picture frame on the filmstrip 82.

A magnetic head 92 is provided behind the exposure aperture 84 to record data on a transparent magnetic recording layer that is formed on a back side surface of the filmstrip 82. The data may include data relating to an image to synthesize with the image data of the photographed image, print option data designating a print format and the requisite number of prints, and date data indicating the date of photography. A controller 95 controls the shutter 85, the CCD 90, the magnetic head 92, a not-shown film feeding device including a motor, and other elements of the camera 80 in accordance with a program stored in a memory 96.

A lid member 100 is hinged to the camera body 80, and the display device 101 is mounted to the lid member 100. The display device 101 is connected to the controller 95. A power source is automatically turned on when the lid member 100 opens. Not shown transparent electrodes are bonded to the surface of the display device 101, which are used as a tablet digitizer. A touch pen 102 for inputting data through the tablet digitizer, and a keyboard 103 are provided on the lid member 100. By use of the touch pen 102, the photographer can add a graphic image, including handwritten words, illustrations and drawings, onto a photographic image of the picture frame as displayed on the display device 101. Then, data of the graphic image is stored in the memory 96, and is recorded on the magnetic recording layer of the filmstrip 82 in association with the related picture frame. The keyboard 103 includes alphanumeric keys, an enter key, a delete key, an escape key and so forth, and is used for inputting command data.

It is possible to display the operation menus on the display device 101 so the photographer can select a menu to execute the photography or the data input operation in a predetermined sequence by the touch pen 102. It is alternatively possible to provide the display device 101 with a touch panel sensor for allowing data input by touching the display device 101 by the finger.

Figure 16:
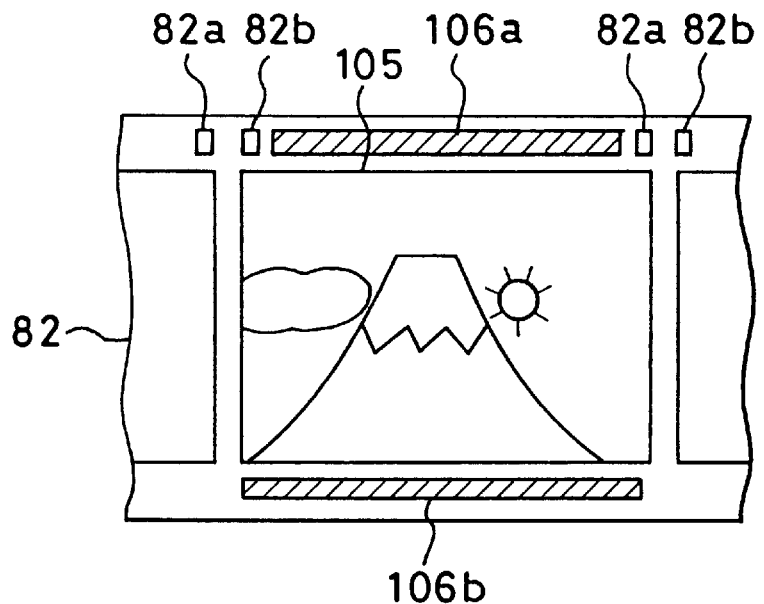
FIG. 16 is an explanatory view illustrating an IX 240 type filmstrip.

FIG. 16 shows an example of developed filmstrip 82. The filmstrip 82 has perforations 82a and 82b which are arranged in pairs at regular intervals. The camera controls feeding the filmstrip 82 by one frame amount with reference to the second perforation 82b of each pair, so a picture frame 105 is recorded in an area between the perforation pairs. The magnetic recording layer is provided on the whole back side surface of the filmstrip 82, and a magnetic track 106a is used for the photofinisher to record print order data, print-exposure correction data and so forth. A magnetic track 106b is used for recording the print option data, the date data, and graphic data. The graphic data represents a graphic image input through the display device 101 by use of the touch pen 102. The positions of the magnetic tracks 106a and 106b are not to be limited to those shown in FIG. 16.

Figure 17:
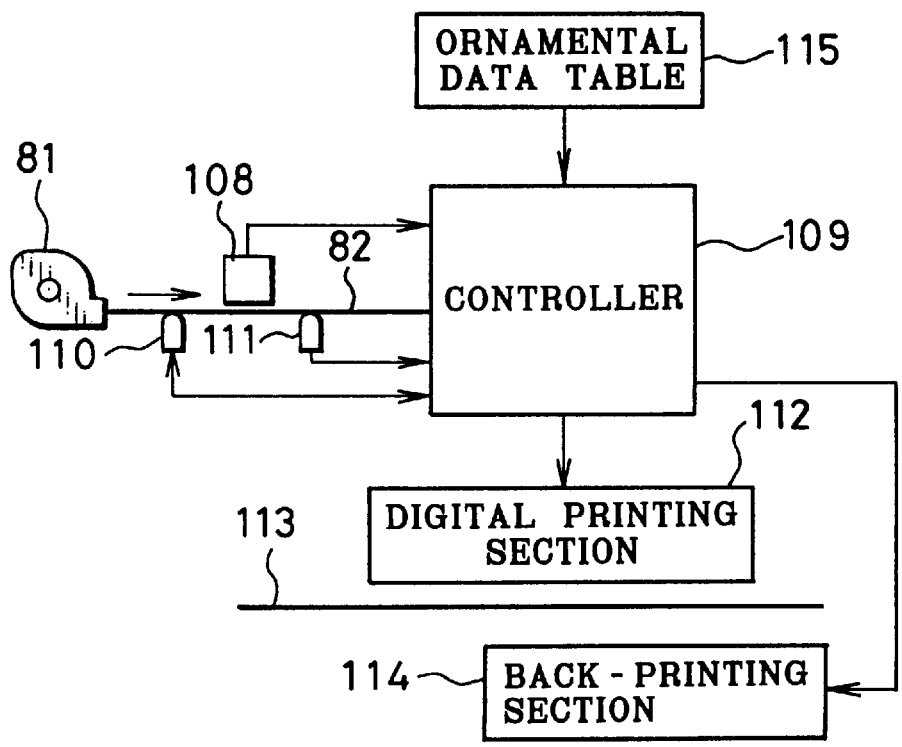
FIG. 17 is a schematic diagram of a printer for use with the camera of FIG. 15.

FIG. 17 shows a printer according to an embodiment of the present invention. When the photo film cartridge 81 is set in the printer, the developed filmstrip 82 is withdrawn from the photo film cartridge 81 toward a scanner 108. The scanner 108 scans the respective picture frames on the filmstrip 82 to pick up image data of the picture frames. The image data is sent to a controller 109. The scanner 108 may have an area image sensor or a line image sensor. In case of the area image sensor, the filmstrip 82 is transported intermittently, and the scanner 108 scans one picture frame at each intermittence. In case of the line image sensor, the scanner 108 scans the picture frames line by line while the filmstrip 82 is continuously transported.

As the filmstrip 82 is transported, a magnetic head 110 reads the data from the magnetic tracks 106a, and sends the data to the controller 109. Simultaneously, a magnetic head 111 reads the data from the magnetic tracks 106b, and sends the data to the controller 109. The controller 109 reproduces the graphic image from the graphic data and the command data as being read from one magnetic track 106b, and synthesizes the graphic image with the photographic image of the associated picture frame. Subsequent synthetic image data is sent to a digital printing section 112, so the synthetic image is printed on color photographic paper 113. The digital printing section 112 may be a Laser line printer, a frame exposure type printer using a CRT or a LCD, or the like.

A back-printing section 114 is provided for printing a frame serial number within the filmstrip 82, the print-exposure correction data, a print order number, a photo-lab ID number, and so forth on the back side of the color photographic paper 113. The back-printing section 114 consists of an ink ribbon cassette and a wire dot printing head. An ornamental data table 115 stores a plurality of predetermined ornamental patterns, each of which may be addressed by a table number. The printer of FIG. 17 and the camera of FIG. 15 constitute a synthetic printing system.

Now, the operation of the synthetic printing system of FIGS. 15 and 17 will be described.

To take a photograph, the photographer opens the lid member 100 to turn the power source on. Then, image data is sent from the CCD 90 to the display device 101, displaying a movie image of the photographic field. The photographer may operate the keyboard 103 to designate a print format, the number of prints and other print commands, which are stored as the print option data in the memory 96.

Figure 18:
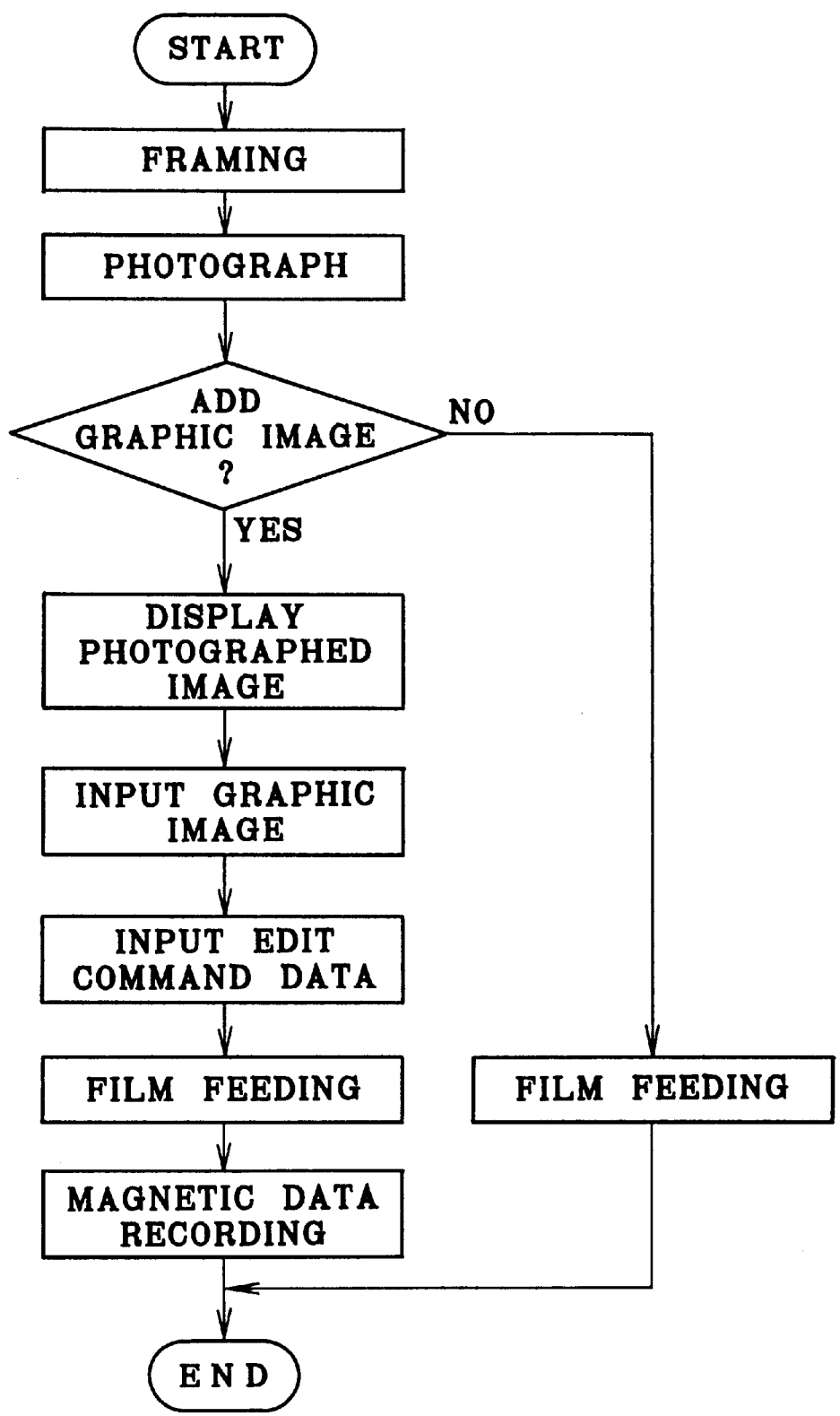
FIG. 18 is a flow chart illustrating an operation sequence of the camera of FIG. 15.

As shown in FIG. 18, after framing the photographic field, the photographer releases the shutter 15 to make an exposure. Synchronously with the shutter release operation, the controller 95 writes the image data of one frame in the image memory 91. If the photographer does not wish to add any image or word to the photographed image, the photographer operates the keyboard 103 to request feeding the filmstrip 82 by one frame. Then, the controller 95 drives the not-shown motor to rotate the take-up spool 83 and wind the filmstrip 82 on the take-up spool 83 by one frame amount. Thereby, the next unexposed portion of the filmstrip 82 is positioned behind the exposure aperture 84. During this one frame advancing, the print option data and the like is read from the memory 96, and is written by the magnetic head 92 on the magnetic recording track 106b.

When the photographer wishes to add a graphic image, the photographer operates the keyboard 103 to enter a command therefor. Then, the image data is read from the image memory 91, and is sent to the display device 101. The display device 101 displays the same image as just photographed on the filmstrip 82. By drawing an appropriate graphic image on the display device 101 by the touch pen 102, the graphic image is resolved into dots corresponding to pixels on the tablet digitizer. Hereinafter, the dots will be referred to as graphic pixels. Thus, the graphic image is represented by a dot pattern, or called bit map pattern, or time sequential handwriting data, and is stored as graphic data in the memory 96. As the graphic pixels have a lower resolution than the image data of the photographed image, it is preferable to adapt the resolution of the graphic pixels to the resolution of the image data by interpolation.

The graphic data written in the memory 96 is sent to the display device 101, and is synthesized with the image data from the image memory 91, so that a synthesized image having the graphic image merged in the photographed image is displayed on the display device 101. When a command to terminate the graphic data entrance is input through the keyboard 103, a menu for assigning edit command data to the graphic data is displayed on a bottom portion of the display device 101 in front of the synthesized image. It is alternatively possible to display the menu only on the display device 101 in place of the synthesized image.

The edit command data is for designating the style of the graphic image, including the line width, the color, the method for smoothing the graphic image, and the ornamental pattern assigned to the graphic image. The ornamental pattern is used for modifying the graphic image. For example, ornamental patterns for a pencil style font, a marker style font, a crayon style font, as well as various printing type fonts, are stored in the ornamental data table 115 in association with a table number each. The photographer can enter the edit command data by choosing on the display device 101 with the touch pen 102. If, for example, the pencil style font is chosen, the graphic image written by the touch pen 102 is modified such that it looks like drawn by the pencil on the printed image. In this embodiment, the individual ornamental pattern is addressed by the table number, but it is preferable to display icons of the respective ornamental patterns on the display device 101.

The pixel density of the tablet digitizer on the display 101 is very rough in comparison with the pixel density of the digital printer 112. For example, one graphic pixel corresponds to 30×30 pixels on the printed image. Therefore, one graphic pixel is converted into a plurality of pixels arranged in a particular ornamental pattern, such that the graphic image is printed in a desired font. For example, one graphic pixel shown in FIG. 19A is converted into an ornamental pattern shown in FIG. 19B. In FIG. 19B, one square consists of 10×10 pixels. FIGS. 20A and 20B show an example of graphic pixel conversion, wherein each graphic pixel of FIG. 20A are converted into the ornamental pattern shown in FIG. 19B, resulting a modified graphic image as shown in FIG. 20B.

When the edit command is input, the display device 101 may preferably display the graphic image modified according to the edit command, to allow the photographer to visually check the modified conditions. Thereafter when the photographer enters a command to terminate the edit command entrance, the controller 95 rotates the take-up spool 83 to wind the filmstrip 82 thereon by one frame amount. During this one frame advancing, the graphic data, the edit command data, the print option data and other data is read from the memory 96, so the magnetic head 92 writes the data read from the memory 96 on the magnetic recording track 106b.

In this way, each picture frame is photographed and, if desired, a graphic image to be merge-printed is input as graphic data. After an available number of picture frames are recorded on the filmstrip 82, the filmstrip 82 is rewound into the cartridge 81. The cartridge 81 is removed from the camera and is forwarded to a photofinisher. The photofinisher withdraws the exposed filmstrip 82 from the cartridge 81, and rewinds the filmstrip 82 into a not-shown intermediate cartridge. The intermediate cartridge is set in a photographic processor for developing the exposed filmstrip 82. The developed filmstrip 82 is rewound back into the cartridge 81, and is set in the printer shown in FIG. 17.

Figure 21:
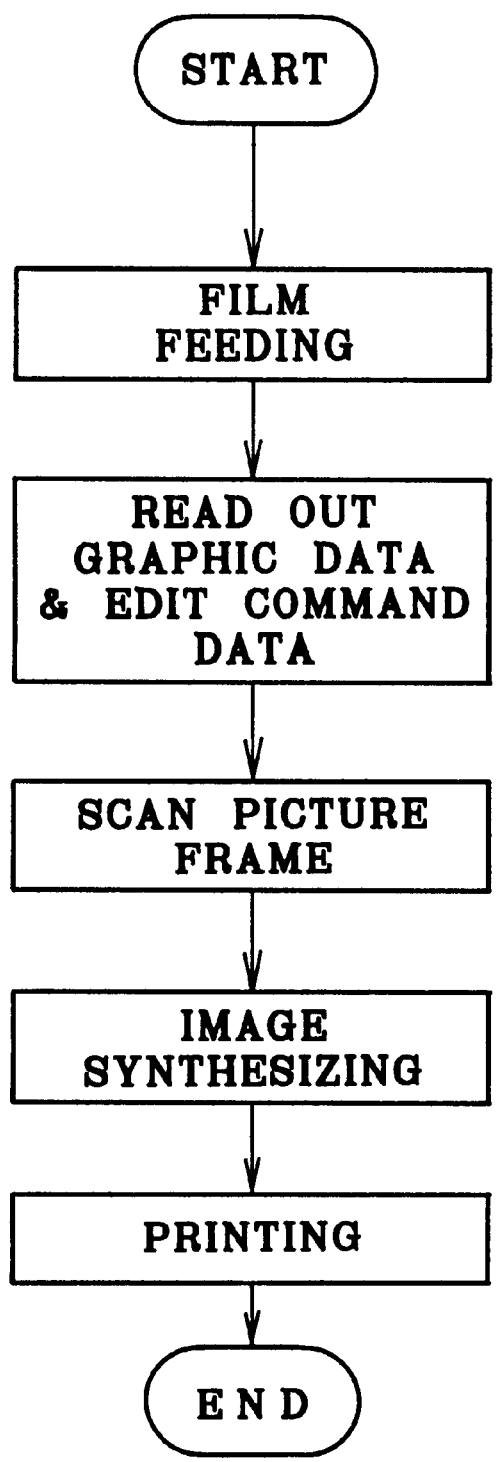
FIG. 21 is a flow chart illustrating an operation sequence of the printer of FIG. 17.

As shown in FIG. 21, the printer rotates a spool of the cartridge 81 in an unwinding direction to advance the filmstrip 82 to the outside. While the first picture frame is fed to the scanner 108, the magnetic head 111 reads the data from the magnetic track 106b of the first picture frame, and sends the data to the controller 109. The scanner 108 scans the first picture frame to pick up image data thereof, and sends the image data to the controller 109.

The controller 109 modifies the graphic data in accordance with the edit command data with reference to the ornamental data table 115. Specifically, the controller 109 selects an ornamental pattern from the ornamental data table 115 in accordance with a table number indicated by the edit command data. Since the positions of the graphic pixels within the frame is already determined, the graphic pixels are converted in the selected ornamental pattern, providing a modified graphic image, as shown in FIGS. 20A and 20B.

Instead of converting each graphic pixel into an ornamental pattern, it is possible to trace the graphic image with an ornamental pattern. FIGS. 22A and 22B show an example of tracing the graphic image, wherein an ornamental pattern consisting of a circled "A" is used. First, each ornamental pattern is enlarged or reduced in size in accordance with the line width of the graphic image. Next, the graphic pixels are replaced with the ornamental patterns while being centered with each other. At that time, the replacement of the graphic pixels may be skipped at appropriate intervals to thin out the ornamental patterns so as the ornamental pattern may not overlap. However, it is possible to overlap the ornamental patterns by intention.

As a result of the above graphic pixel conversion or replacement, the resolution of the modified graphic image is adjusted to that of the photographed image, and the modified graphic image is positioned properly in the photographed image. The controller 109 synthesizes the modified graphic image with the photographed image read by the scanner 108 by substituting pixels of the modified graphic image for corresponding pixels of the photographed image. It is also possible to take a weighted average of each color data of each pixel between the modified graphic image and the photographed image, to provide a synthetic image where the modified graphic image is overlapped as a transparent image on the photographed image.

Image data of the synthetic image is sent to the digital printing section 112, which then prints the synthetic image on the color photographic paper 113. In addition, the frame serial number, the print order number, the photo-lab ID number and other numerical data are printed on the back side of the photographic paper 113.

When the first picture frame has been printed, the controller 109 withdraws the filmstrip 82 by one frame, so the scanner 108 scans the second picture frame. If there is a graphic image assigned to the second picture frame, the magnetic head 111 reads out the graphic data. The graphic data is converted into modified graphic image, and is synthesized with the image of the second picture frame, in the same way as described with respect to the first frame. Thus, the digital printing section 112 prints a synthetic image of the second picture frame on the color photographic paper 113. In the same way, the following picture frames are sequentially printed on the color photographic paper 113. When all of the picture frames on the filmstrip 82 are printed out, the spool of the cartridge 81 is rotated to wind up the filmstrip 82 into the cartridge 81.

The color photographic paper 113 having the images recorded thereon is developed through a paper processor, and is cut into individual photo-prints. For instance, a photo-print corresponding to the first picture frame contains the same synthetic image as displayed on the display device 101 in FIG. 15, though the graphic image is modified with an ornamental pattern designated by the photographer.

Although it is omitted from the drawings, a film inspection process is provided between the film development and the printing, for checking exposure conditions of the picture frames on the filmstrip 82 and determining exposure correction amounts for those picture frames whose exposure conditions are not proper. The exposure correction amounts are recorded as print-exposure correction data on the magnetic track 106a of the filmstrip 82. Then, the digital printing section 112 controls the exposure amount for each pixel in accordance with the print-exposure correction data read from the magnetic track 106a.

It is preferable to connect a color monitor and a keyboard to the controller 109. The color monitor displays an image simulating a synthetic image printed at an exposure amount. If it is determined based on the simulation image that the printed image would not be optimum, the photofinisher enters correction amounts through the keyboard. Then, the color monitor displays an exposure-corrected synthetic image. If the synthetic image is printed at the manually corrected exposure amount, the manual correction amounts are recorded as print-exposure correction data on the magnetic track 106a through the magnetic head 110, so the manual correction amounts may be utilized for reprinting.

Instead of choosing one of the ornamental patterns previously stored in the ornamental data table 115, the photographer may create an ornamental pattern. In order to give a marker-like texture or a pencil-like texture to the graphic image, an ornamental pattern may be produced by use of the well-known computer graphic (CG) technic, or based on image data obtained by scanning a drawing written by markers or pencils.

Figure 23A:
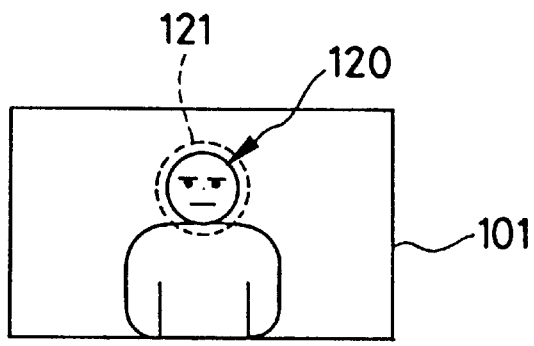
FIGS. 23A and 23B are explanatory views illustrating an example of producing an ornamental pattern from a part of a photographic image.
Figure 23B:
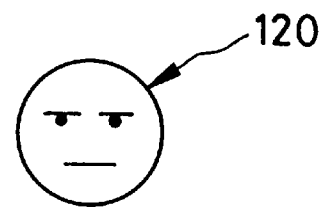

FIGS. 23A and 23B shows an example of producing an ornamental pattern from a part of the photographed image. For this operation, the photographer operates the keyboard 103 to set the camera in an ornamental pattern registration mode. Then, the controller 95 displays the latest photographed image on the display device 101. It is alternatively possible to display an image of an appropriate picture frames on the display device 101 by designating the frame serial number, on the assumption that the image memory 91 has a capacity enough to store image data of all picture frames, e.g. 40 picture frames, of the filmstrip 82. It is also possible to change the magnification of the image displayed on the display device 101.

As shown for example in FIG. 23A, the photographer traces an outline of an area or part 120 of the displayed image by the touch pen 102, to designate the part 120 as an ornamental pattern. Then, a boundary line 121 is displayed to show the course traced by the touch pen 102. Thus, the part 120 of the displayed image is registered as an ornamental pattern as shown for example in FIG. 23B. It is possible to designate a part of the displayed image as an ornamental pattern through the keyboard 103, by entering a center position and a size of the part. Then, a circular, rectangular or polygonal boundary line is displayed around the designated center position in the designated size.

Although it is possible to record image data of the designated part as ornamental pattern data on the magnetic track 106b of the filmstrip 82, a certain recording area is necessary for the image data. Therefore, registration data locating the part designated as an ornamental pattern is stored in the memory 96 and is recorded on the magnetic recording layer of the filmstrip 82. The registration data includes a film ID number, a frame serial number, data defining the boundary of the part registered as an ornamental pattern, and a new table number given to the newly registered ornamental pattern.

Once the part of the photographed image is registered as the ornamental pattern, the photographer can utilize the ornamental pattern for any other graphic images added to other picture frames by assigning the new table number. The new table number is recorded as edit command data along with graphic data of a graphic image on the magnetic track 106b in association with the picture frame to synthesize with the graphic image.

Figure 24A:
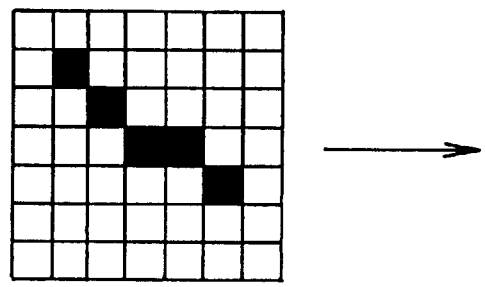
FIGS. 24A and 24B are explanatory views illustrating portion of a graphic image and a corresponding portion of a modified image obtained by converting each pixel into the ornamental pattern of FIG. 23B.
Figure 24B:
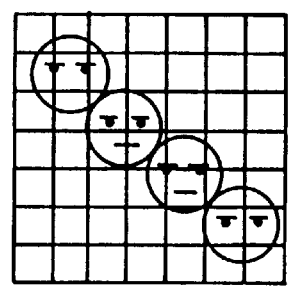

The printer reads out the registration data from the filmstrip 82, and picks up image data from the picture frame designated by the registration data. The image data of the part registered as the ornamental pattern is extracted from the image data of the designated picture frame. The image data of the registered ornamental pattern is stored along with the new table number in the ornamental data table 115. If necessary the size of the ornamental pattern is reduced or enlarged before stored in the ornamental data table 115. Thereafter when the new table number is assigned as edit command for a graphic image to a picture frame, the printer reads out the registered ornamental pattern from the ornamental data table 115, and converts graphic pixels of the graphic image in accordance with the registered ornamental pattern, as shown for example, in FIGS. 24A and 24B.

Figure 25A:
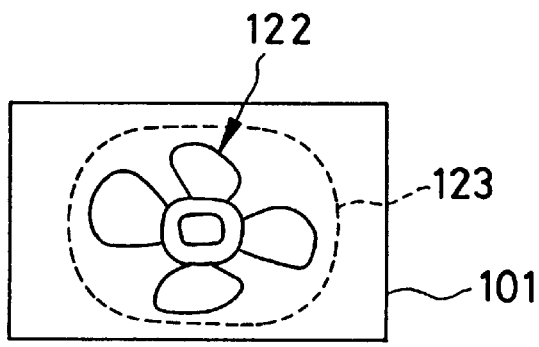
FIGS. 25A and 25B are explanatory views illustrating an example of producing an ornamental pattern from a drawing.
Figure 25B:
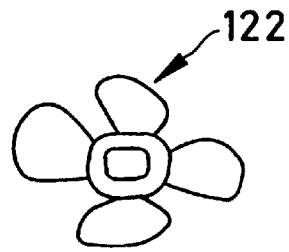

It is also possible to register a handwritten pattern, including characters, symbols and illustrations, as an ornamental pattern. For this operation, the camera of FIG. 15 is set in the ornamental pattern registration mode, and then in a handwriting mode. Then, the display device 101 displays a blank over the whole screen area, so the user can draw an appropriate pattern 122 on the blank screen, as shown for example in FIG. 25A. The handwritten pattern 122 is stored as bit map data in the memory 96. Thereafter, a boundary line 123 is written by the touch pen 102 around the pattern 122. Thereby, image data of an area bounded by the boundary line 123 is stored as ornamental pattern data, as is implied in FIG. 25B. It is possible to use a plurality of colors within an ornamental pattern. To designate a color of each line or pixel of the ornamental pattern, color designation data is added to the ornamental pattern data.

A table number is also given to the handwritten pattern for registration as an ornamental pattern. The ornamental pattern data and the table number are recorded on the magnetic recording layer of the filmstrip 82. The printer reads out the ornamental pattern data from the filmstrip 82, and writes it with the table number in the ornamental data table 115. If necessary the size of the handwritten pattern is reduced or enlarged before stored in the ornamental data table 115. Thereafter when the table number of the handwritten pattern is assigned as an edit command, the handwritten pattern is used as the ornamental pattern for modifying a graphic image.

Figure 26:
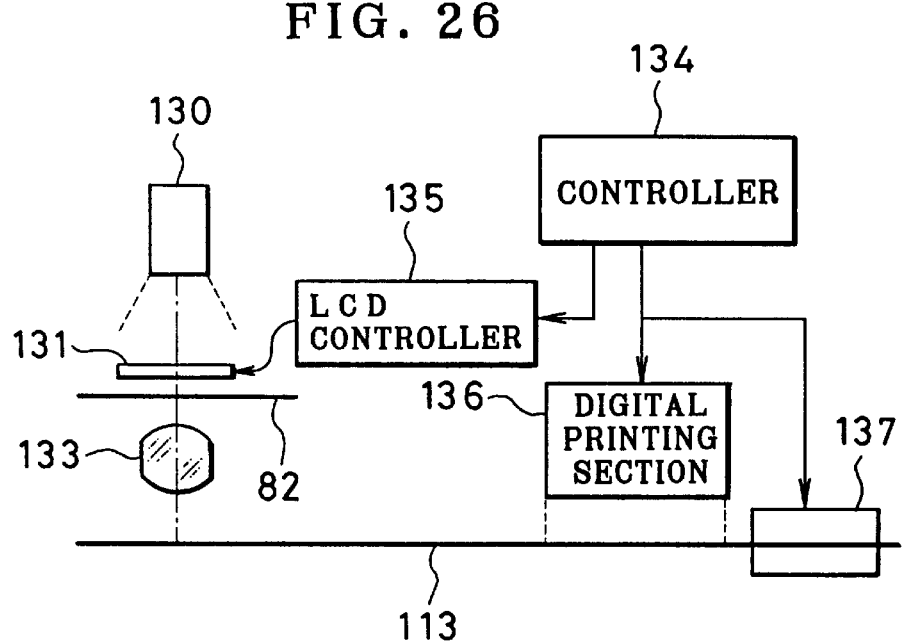
FIG. 26 is a schematic diagram of a printer for making a synthetic print, wherein a graphic image is printed by a digital printing section after a picture frame is printed at one exposure onto color photographic paper.

In the printer shown in FIG. 17, the photographed image and the manually input graphic image are electrically synthesized. As an alternative, it is possible to provide a frame exposure type printing section in addition to a digital printing section, for optically synthesize the graphic image with the photographed image. FIG. 26 shows an embodiment for the optical image synthesizing. The frame exposure type printing section consists of a light source 130, an LCD panel 131 that is put into contact with the developed filmstrip 82, and a printing lens 133 for forming an image of the picture frame on color photographic paper 113. The light source is constituted of a white lamp and a diffusion box.

For a picture frame with a manually input graphic image to synthesize, a controller 134 drives those pixels of the LCD panel 131 opaque, which correspond to pixels of the graphic image as modified. Other pixels of the LCD panel 131 are set in the transparent state at an identical transparency rate, e.g. 100%. Light from the light source 130 travels through the transparent pixels of the LCD panel 131 and the picture frame of the filmstrip 82, and is projected through the printing lens 113 onto the color photographic paper 113. After an image of the picture frame is printed in this way, the color photographic paper 113 is fed to a digital printing section 136. The digital printing section 136 prints the graphic image on the color photographic paper 113 in an appropriate position within the previously printed picture frame. In this way, the graphic image is superimposed on the photographed image. Designated by 137 is a back-printing section.

Figure 27:
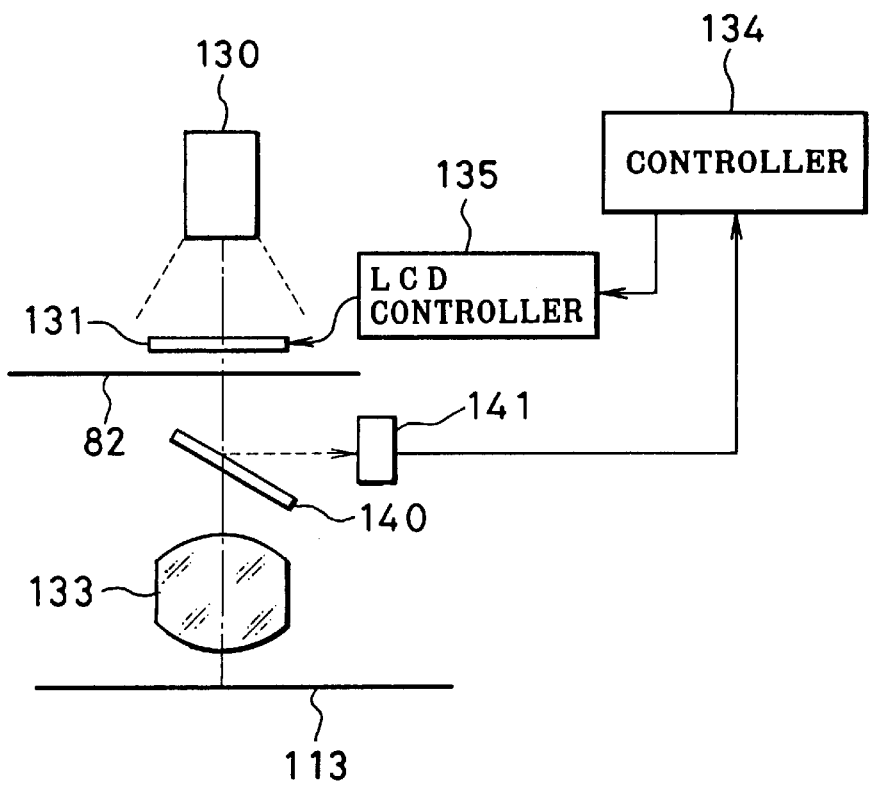
FIG. 27 is a schematic diagram of a printer for making a synthetic print, wherein a graphic image is printed in the same exposure station as used for printing a picture frame on color photographic paper.

FIG. 27 shows a printer which has merely a frame exposure type printing section only, according to another embodiment of the present invention. In FIG. 27, those elements which are equivalently used in the frame exposure type printing section are designated by the same reference number as used in FIG. 26. In this embodiment, however, an LCD panel 131 should be a color LCD panel which consists of three color pixels arranged in a predetermined matrix pattern, and is able to change the transparency rate of its pixels each individually, so the gradation of printed three color pixels may be changed each individually.

When to print a picture frame with a graphic image to synthesize, those pixels of the LCD panel 131 which correspond to the graphic image are set in the opaque state, while other pixels are set in the transparent state of the constant transparency rate. Light from a light source travels through the transparent pixels of the LCD panel 131 and the picture frame on the filmstrip 82, and is projected onto color photographic paper 113 through a half mirror 140 and a printing lens 133.

Thereafter, only those pixels of the LCD panel 131 which correspond to the graphic image are set in the transparent state, so that the graphic image is optically projected onto the photographic paper 113. As the light for printing the graphic image travels through the picture frame of the filmstrip 82, color balance and intensity of the printing light is influenced by colors and densities of the corresponding pixels of the picture frame. Therefore, in order to print the graphic image in a designated color at an appropriate density, it is necessary to control exposure for each pixel of the graphic image so as to cancel the effect of the corresponding pixels of picture frame.

For this purpose, a half mirror 140 and a CCD 141 are provided. The light travels through the LCD panel 131 and the filmstrip 82 is reflected by the half mirror 140, and is directed to the CCD 141. The CCD 141 has the same size pixels as those of the LCD panel 131, so that the amount of incident light on each pixel of the CCD 141 corresponds to the amount of light traveling through each pixel of the LCD panel 131 and the filmstrip 82.

Supposing that E(i, j) represents a desired print-exposure amount for a particular pixel which is located at a coordinate point (i, j) within the LCD panel 131, I(i, j) represents an amount of light per unit time that passes through the corresponding pixel of the LCD panel 131 and the filmstrip 82, and T(i, j) represents an exposure time of the photographic paper 113, the print-exposure amount E(i, j) may be obtained by controlling the transparent light amount I(i, j) and/or the exposure time T(i, j).

To control the transparent light amount I(i, j), each of those LCD pixels which are set in the transparent state for recording the graphic image is set at a different transparency rate. First, all of those LCD pixels corresponding to the graphic image are set at an equal transparency rate, and an exposure time T(i, j) necessary for obtaining the desired print-exposure amount E(i, j) is calculated for each pixel based on the amount of incident light on the corresponding pixel of the CCD 141. Among the calculated exposure times, the longest exposure time is determined to be used for all pixels of the graphic image. Thereafter, the transparency rates of the LCD pixels are each individually changed to provide the desired print-exposure amount E(i, j). The calculation is done at the beginning of printing. Of course, it is possible to provide a shutter in front of the photographic paper 113, and open the shutter after determining the transparency rates of the concerned LCD pixels. It is to be noted that the print-exposure amount is determined for each color, as the LCD panel 131 consists of three color pixels arranged in matrix.

When to control the exposure time T(i, j) while maintaining the transparency rate unchanged between the LCD pixels for the graphic image, it is necessary to control the ON-OFF timing of the concerned LCD pixels with high accuracy. In this case, the exposure time may be calculated for each pixel based on the photometric value from the CCD 141 during the printing. As a method of controlling both the exposure time and the transparent light amount, it is possible to change the exposure time stepwise, while controlling the transparency rate within each step of exposure time.

Since ISO 135 type photo filmstrips are not provided with a magnetic recording layer, a data recording medium such as an IC memory card and a floppy disc, may be used for recording the graphic data and the edit command data. It is possible to incorporate an IC memory into a photo film cartridge, for recording the graphic data and the edit command data therein. In that case, data for correlating the graphic data with the concerned picture frames is stored in addition to the graphic data.

It is possible to store image data of all picture frames on one filmstrip in the image memory 91, and display the respective picture frames one after another on the display device 101, thereby to permit entering and recording graphic data. The graphic data may be recorded in the following ways.

The graphic data may be recorded on the individual magnetic tracks of the assigned picture frames. In that case, the filmstrip 82 is once rewound back into the cartridge 81, and is advanced again from the cartridge 81 to record the graphic data on the magnetic tracks. If the graphic data is entered and recorded in this way before the filmstrip 82 is completely exposed, a next unexposed portion of the filmstrip 82 should be positioned again behind the exposure aperture 84. But it is unnecessary to record data for correlating the graphic data with the concerned picture frames.

Alternatively, the graphic data may be recorded all on a common magnetic recording area within the filmstrip. For example, the common magnetic recording area is located in a trailing end of the filmstrip 82, so that all of the graphic data is recorded on that area immediately before the start of rewinding the completely exposed filmstrip 82 back into the cartridge 81. The common magnetic recording area may be located in a leading end of the filmstrip 82, so that all of the graphic data is recorded on that area at the end of the film rewinding operation. In these cases, it is necessary to add data for correlating the graphic data with the concerned picture frames.

In the above embodiment, a graphic image to be synthesized with a picture frame is written on the display device of the camera after the photography of the picture frame. But it is possible to enter the graphic image immediately before the photography of the concerned picture frame. It is also possible to enter the graphic image through a separate graphic image input device. In order to make it possible to enter the graphic image through the separate graphic image input device before the photo film is developed, image data of the picture frames must be written in a recording medium concurrently with each exposure. Once the photo film is developed, the image data of the picture frames may be detected by an image scanner. Based on the image data, the picture frames are displayed on a monitor screen of the separate graphic image input device. It is also possible to display a blank frame corresponding to the concerned picture frame on the monitor screen of the graphic image input device, and define a handwriting area within the blank frame. The graphic image is written in the handwriting area, and then position data of the handwriting area is added to the graphic data of the graphic image. Thus, the graphic image is merge-printed in the designated position within the picture frame.

It is possible to use a graphic image input device that uses a light pen or another device instead of the touch pen.

As an image source for producing an ornamental pattern, not only an image photographed by the user, but also an image detected by an image scanner, an image produced by a personal computer, a video image and so forth are available. It is possible to provide the camera of FIG. 15 with a mode for converting handwritten characters into printing type characters. It is also possible to provide a mode for laying out the ornamental patterns within the graphic image. For example, when the ornamental patterns are overlapped each other within the graphic image, the user may determine whether data values of the two pixels overlapping each other should be added to each other, or whether one of the two overlapping pixels are replaced with the other. When the ornamental patterns are spaced each other within the graphic image, the user may select the spacing between the ornamental patterns.

By entering a graphic image as time sequential data, it is possible to determine direction and speed of drawing a line per unit length. The ornamental patterns may be deformed based on the drawing direction and/or the drawing speed. For example, it is possible to turn the ornamental pattern in accordance with the drawing direction, or change the size of the ornamental pattern in accordance with the drawing speed, for instance, such that the width of the line decreases as the drawing speed goes up. For changing the line width of the ornamental pattern, conventional thinning/boldfacing process is useful. For smoothing the line, conventional smoothing process is useful. The ornamental pattern may be fringed by boldfacing the lines and then coloring edge pixels of the lines.

Figure 28:
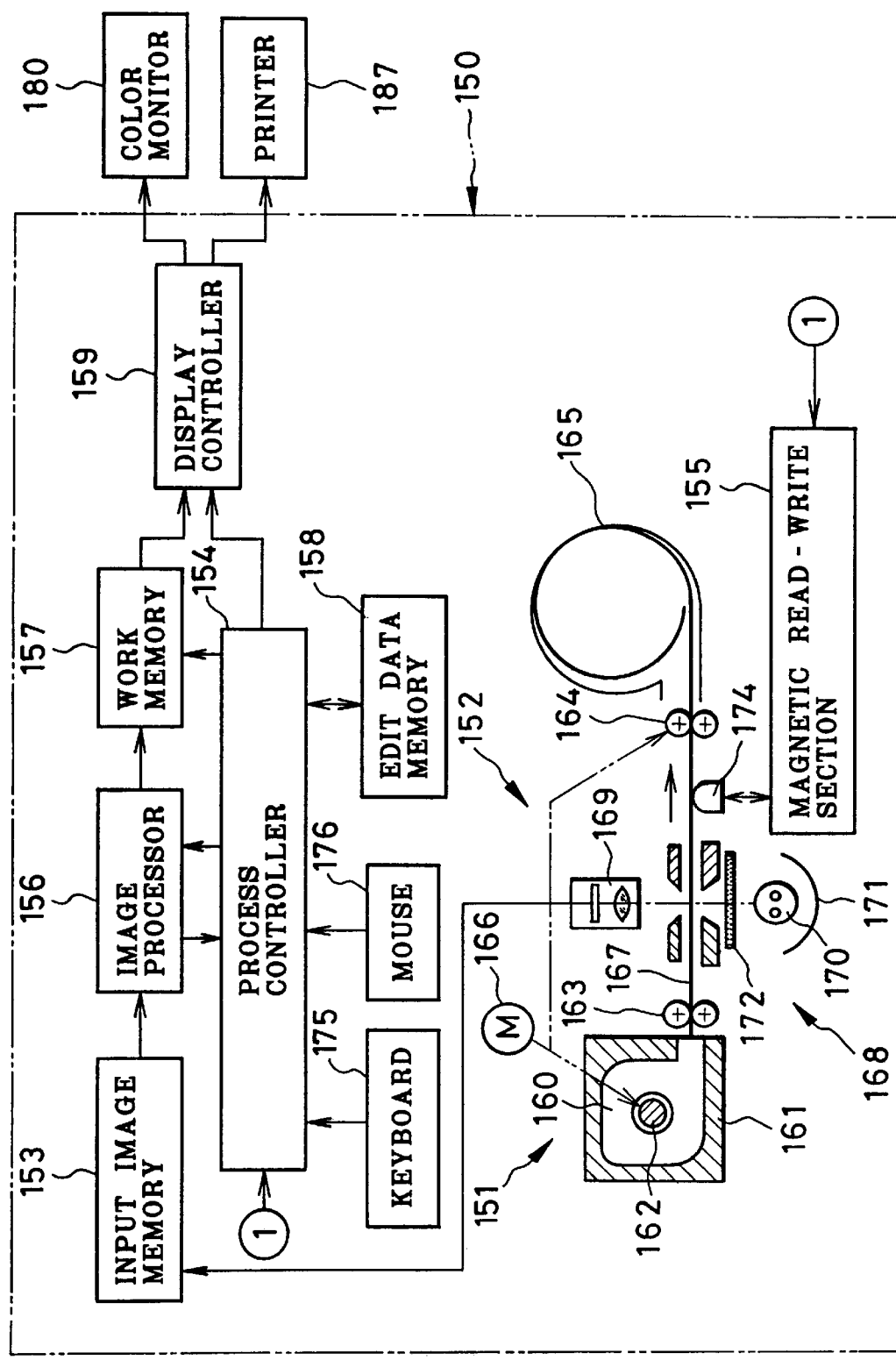
FIG. 28 is a schematic diagram illustrating an image editing monitoring apparatus according to an embodiment of the invention.

FIG. 28 shows an image editing monitoring apparatus for editing a virtual photo album by screen editing, according to an embodiment of the present invention. The image editing monitoring apparatus 150 is constituted of a film feeding section 151, a frame imaging section 152, an input image memory 153, a process controller 154, a magnetic read-write section 155, an image processor 156, a work memory 157, an edit data memory 158, and a display controller 159.

The film feeding section 151 consists of a cartridge holder 161 for holding a photo film cartridge 160, a spool drive shaft 162, a guide roller pair 163, a feed roller pair 164, and a cylindrical film accepting portion 165. The cartridge holder 161 has a cavity and a lid for closing an open end of the cavity. When the photo film cartridge 160 is set in the cavity of the cartridge holder 161, the spool drive shaft 162 is engaged with a spool of the cartridge 160. The spool drive shaft 162 is driven by a motor 166 to rotate the spool in a winding direction or an unwinding direction. The motor 166 is also used for rotating the feed roller pair 164.

The cartridge 160 has a device for advancing a leader of a filmstrip 167 to the outside upon the spool being rotated in the unwinding direction. When the leader comes to squeeze into between the feed roller pair 164, the filmstrip 167 is transported by the rotational movement of the feed roller pair 164, and the spool drive shaft 162 is disconnected from the motor 166. The film accepting portion 165 accept the filmstrip 167 in the form of a coil.

The frame imaging section 152 and the magnetic read-write section 155 are disposed between the guide roller pair 163 and the feed roller pair 164. The frame imaging section 152 consists of a light source 168 and an imaging device 169. The light source 168 consists of a fluorescent lamp 170 whose light emission properties are suitable for the photo film, and a reflector 171 and a diffusion plate 172. The imaging device 169 is constituted of an image scanner having a line image sensor, which scans the picture frames synchronously with the film feeding, detecting image data from the picture frames. The image data is stored in the input image memory 153.

The magnetic read-write section 155 reads photographic data from a transparent magnetic recording layer of the filmstrip 167 through a magnetic head 174, and sends the photographic data to the process controller 154. In this embodiment, the photographic data includes frame serial numbers which are used for identifying individual picture frames. If the filmstrip 167 has already been subjected to an edition process as set force in detail below, edit data is recorded on the transparent magnetic recording layer of the filmstrip 167. Then, the magnetic read-write section 155 reads the edit data as well as the photographic data, and sends the data to the process controller 154.

The process controller 154 is constituted of a microcomputer, and sequentially controls the respective elements of the image editing monitoring apparatus 150. A keyboard 175 and a mouse 176 are connected to the process controller 154, so the image editing monitoring apparatus 150 may be switched over between an imaging mode, an edition mode, and a monitor mode by operating the keyboard 175 and the mouse 176. The process controller 154 is installed with a program for editing the image data, which is activated when the edition mode is selected. Conventional photography processing software may be used as the program for editing the image data. It is, of course, possible to program specific software to the edition mode of this embodiment.

If the edit data is not read out from the filmstrip 167, the process controller 154 automatically sets the image editing monitoring apparatus 150 in the edition mode. If the edit data is read out from the filmstrip 167, the process controller 154 determines that the filmstrip 167 has been through the edition process, and automatically sets the image editing monitoring apparatus 150 in the monitor mode. In addition, it is possible to manually select either the edition mode or the monitor mode.

Figure 29:
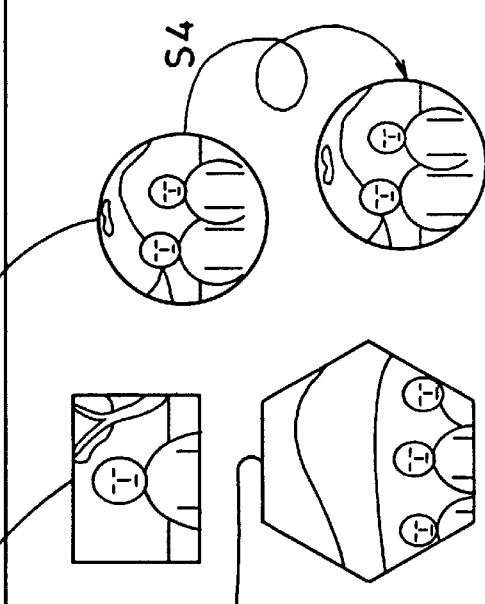
FIG. 29 is an explanatory view illustrating an example of display on a monitor screen of the image editing monitoring apparatus of FIG. 28 in an edition mode.

In the edition mode, a pasteboard area or a virtual photograph album page 182 and a frame display area 183 are displayed side by side on a screen 181 of a color monitor 180, as shown for example in FIG. 29. The imaging device 169 picks up image data from the respective picture frames on the filmstrip 167. The image processor 156 processes the image data for negative-to-positive conversion and for density and color balance correction, and then compresses the image data. Based on the compressed image data, a plurality of picture frames, e.g. six picture frames at one time, are sequentially displayed in the frame display area 183 on the monitor screen 181. It is possible to display all picture frames of one filmstrip 167 at once in the frame display area 183. It is also possible to magnify a desired one of the plurality picture frames or a part of one picture frame on the monitor screen 181, for visual confirmation of the image detail.

The user can edit an appropriate picture frame by designating the frame serial number, the location to paste the picture frame in the pasteboard area 182, and the size and shape of the picture frame on the pasteboard area 182. The edition process is carried out one picture frame after another. Specifically, the user selects a picture frame 185 to edit among a plurality of picture frames 185 displayed on the frame display area 183 by clicking a designated push switch of the mouse 176 once while placing a pointer 184 at that picture frame 185 by use of the mouse 176. Thereby the process controller 154 reads in the frame serial number of that picture frame 185. Thereafter, the user drags the mouse 176 to move the pointer 184 from the selected picture frame on the frame display area 183 to an appropriate position of the pasteboard area 182. When the user drops the mouse 176 at the appropriate position, the selected picture frame is pasted into that position on the pasteboard area 182. It is possible to omit the click step, and designate the picture frame and its pasting position just by the drag and drop step.

Figure 30:
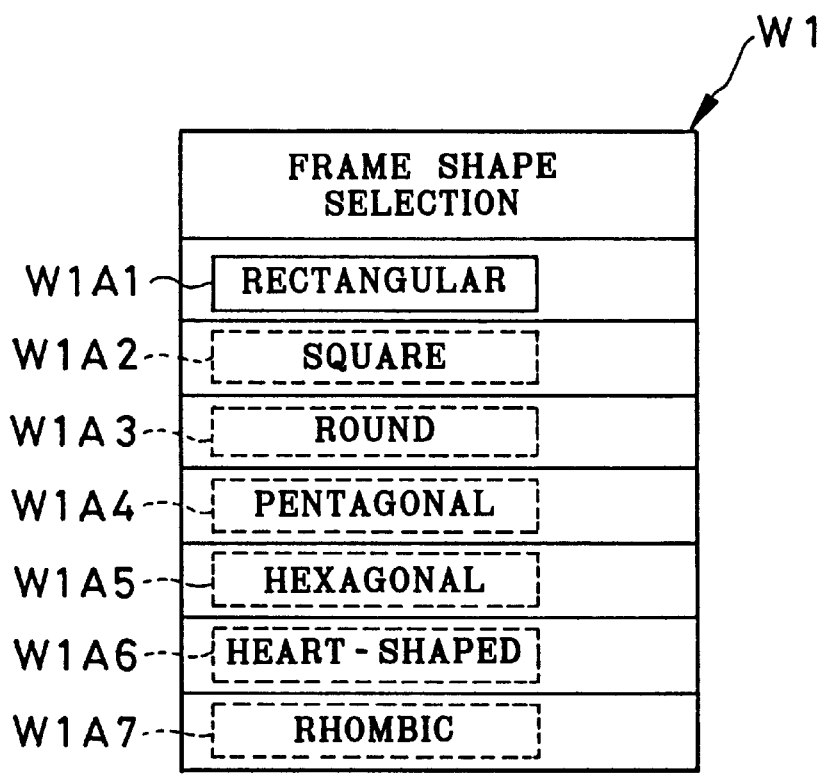
FIG. 30 is an explanatory view illustrating a frame shape selection table available on the monitor screen in the edition mode.

Thereafter, the user rolls out a frame shape selection table W1 on the screen 181, as shown in FIG. 30, and designates the shape of the selected picture frame by setting the pointer 184 at one of table areas W1A1, W1A2, . . . W1A6, and W1A7, and clicking the mouse 176 at that position. In the embodiment shown in FIG. 30, the table areas W1A1 to W1A7 respectively represent a rectangular frame, a square frame, a round frame, a pentagonal frame, a hexagonal frame, a heart-shaped frame, and a rhombic frame. For instance, the user clicks the mouse 176 while pointing at the table area W1A1, so the rectangular frame is assigned to the selected picture frame 185. If is, of course, possible to prepare other shapes as frame shape options than those listed in the present embodiment. It is also possible to customize and register a special frame shape.

In this way, an appropriate number of picture frames, e.g. frames No.1 to No.3, are selected from the frame display area 183, and are pasted in desired frame shapes onto appropriate positions of the pasteboard area 182, one frame after another, as implied by dragging lines S1, S2 and S3 in FIG. 29. Each picture frame pasted on the pasteboard area 182 may also be partly or wholly magnified for visual confirmation of the image detail.

It is also possible to relocate the pasting position of the picture frame within the pasteboard area 182 by the same drag and drop operation as above, as shown for example by a drag line S4 in FIG. 29. The movement of the pointer 184 from the initial position to the final position, e.g. the course of the drag line S4, is sampled at regular intervals, and is stored as course data in the edit data memory 158.

Not only the course data, but all of the edition process is stored as edit data in the edit data memory 158, in a time sequential fashion as shown for example in FIG. 31. In FIG. 31, a command set number is a serial number given to each edition process such as pasting, relation etc. in a time-sequential fashion. For the sake of easy understanding, the same numbers S1 to S4 that are used for designating the drag lines are used as command set numbers for the corresponding edition processes. As edit data items, content of command, an image source, a process result, supplemental data, and a display time duration are stored for each edition process.

As will be described later, the image editing monitoring apparatus 150 reproduces based on the edit data the edition processes of the respective picture frames time-sequentially on the color monitor 180 in the monitor mode. The display time duration for displaying each edition process in the monitor mode may be given by the user during the individual edition process in the edition mode.

Figure 32:
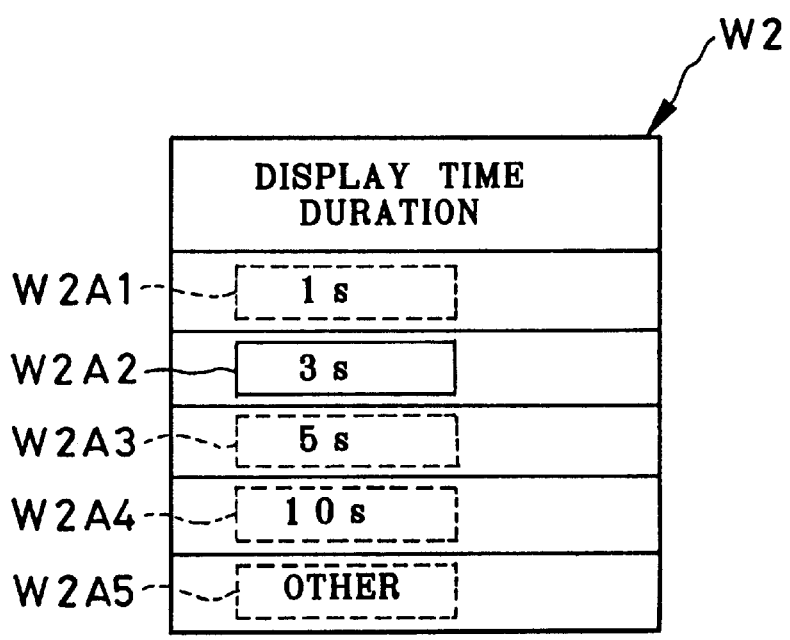
FIG. 32 is an explanatory view illustrating a display time duration set up table available on the monitor screen in the edition mode.

According to the present embodiment, the user may roll out a display time duration table W2 on the screen 181, as shown in FIG. 32, and assign a time duration to the present edition process by clicking one of table areas W2A1, W2A2 ... W2A5 of the display time duration table W2. For example, by clicking the table area W2A2, the display time duration is set at 3 seconds. By clicking the table area W2A5, the user can set up an appropriate display time duration other than predetermined options, including 1 second, 3, 5 and 10 seconds in the embodiment shown in FIG. 32.

As the content of command, there are "paste" and "relocate". As the image source, the frame number of the picture frame selected to paste is stored for each pasting process, or an initial position in the pasteboard area 182 is stored for each relocation process. As the process result, a pasting position in the pasteboard area 182 is stored in either case. As the supplemental data, an area data file is stored for each pasting process, or a course data file is stored for each relation process.

As the content of command, there may be "delete frame", "magnify frame", "reduce frame" and "rotate frame" in addition to "paste" and "relocate". For instance, in response to the command "frame delete", a designated picture frame is displayed for a given time and then deleted. Each picture frame may be magnified or reduced or rotated about a reference point. To delete the picture frame, it is possible to reduce the size of the picture frame to zero while shifting the position of the picture frame. It is also possible to magnify or reduce or rotate the picture frame while shifting the picture frame along a given course.

The user enters a reference point, a magnification or reduction rate, or a rotational angle of the selected picture frame by use of the mouse 176 and the keyboard 175, while rolling out tables therefore, though they are not shown in the drawings.

The area data file includes a file name, an area number, a frame shape, a reference position, a magnification or reduction rate, and/or a rotational angle of the picture frame. FA1, FA2, FA3 ... are used as the file names for identifying the individual area data files. The area number represents a location of the pasteboard area that is selected as the final pasting position. The frame shape represents one of the frame shapes selected from the frame shape selection table W1.

The course data file includes a file name, a command set number, and course data. FB1, FB2, ... are used as the file names for identifying the individual course data files. As the command set number, a command set number given for that relocation process, i.e. S4 in this instance, is stored. As the course data, positions of the reference point of the picture frame are sampled at regular intervals, i.e. at every 1/10 seconds, during the relocation process, and are stored as coordinate values along with the relative times.

When a decision key of the keyboard 175 is operated to terminate the edition mode after the edit data of the respective edition processes are time-sequentially stored in the edit data memory 158, the filmstrip 167 is rewound back into the cartridge 160, and edit data is written on the magnetic recording layer of the filmstrip 167 through the magnetic head 174 of the magnetic read-write section 155.

In the monitor mode, the edit data read from the filmstrip 167 is sent to the process controller 154. The process controller 154 controls the imaging device 169 to pick up image data of only those picture frames which are designated by the edit data. The image data is stored in the input image memory 153, and the image processor 156 processes the image data for negative-to-positive conversion and for density and color balance correction. Thereafter, the image data is stored in the work memory 157. The process controller 154 edits the image data stored in the work memory 157 in accordance with the edit data. The color monitor 180 displays only the pasteboard area 182 in the monitor mode, and edited picture frames are displayed in the pasteboard area 182 in a time sequential fashion, as shown for example in FIG. 33.

First, a first picture frame is displayed in a designated location of the pasteboard area 182 in the form of a rectangular frame for a designated time duration t1, e.g. 3 seconds, showing the first edition process S1. Next, the second picture frame is displayed in the form of a circular frame in addition to the first picture frame, showing the second edition process S2. The second edition process S2 is shown for a designated time duration t2. Then, a third picture frame is displayed in the form of a hexagonal frame in addition to the first and second frames, showing the third edition process S3. The third edition process S3 is shown for a designated time duration t3. Thereafter, the second picture frame moves along the same course that the second picture frame was moved within the pasteboard area 182 in the edition mode, as implied by a line L1 in FIG. 33, showing the fourth edition process or relocation process S4.

In this way, the user can review the edition processes of the respective picture frames in the time sequential fashion. By operating a freeze key of the keyboard 175 at any stage in the monitor mode, the image of the pasteboard area 182 is freezed, and data of the freezed image is sent to a color printer 187, so the color printer 187 makes a hard copy of the image of the pasteboard area 182. The hard copy may be filed in a photo album.

The image editing monitoring apparatus 150 of the present invention may be installed in a house, and a home TV may be used as the color monitor 180. The color printer 187 may be an ink jet printer, a thermal printer, or the like. It is also possible to make a hard copy of the image of the pasteboard area 182 through a photo-printer. For this purpose, the film with the edit data is forwarded to a photofinisher. FIG. 34 shows a printer-processor 190 for this embodiment. The printer-processor 190 is provided with an index printing section 192, a main printing section 193, and a paper processing section 194 which are arranged along a path of color photographic paper 191. The index printing section 192 is constituted of a digital printer, which picks up image data of all picture frames of one filmstrip, and makes an index print that contains all picture frames of one filmstrip. An image editing section 195 having a similar construction to the image editing monitoring apparatus 150 is connected to the index printing section 192, so the index printing section 192 may print out a hard copy of the edited picture frames, in the same way as described with respect to the image editing monitoring apparatus 150.

If the data read from the magnetic recording layer of the filmstrip 167 includes the date of photography or the title given by the photographer on the camera side, the date of photography or the title may be displayed besides the picture frame on the color monitor 180. It is also possible to enter title or message as a graphic image and synthesize it with a photographed image in the edition mode of the image editing monitoring apparatus 150. The graphic image may be input by use of a mouse, a touch pen, or a light pen, and may be processed as words, or as drawings. In any case, the process of entering the graphic image is also stored as an edition process in the edit data memory 158 in association with a command set number. It is possible to store and reproduce the course of movement of the mouse or the pen in the monitor mode, displaying the graphic image entering processes in more interesting way.

As described so far, the image editing monitoring apparatus of the present invention facilitates pasting and relocating picture frames on a pasteboard of a virtual photo album, and provides a wider room for modifying the image quality and the frame shape or size. Since only the edit data is recorded in a recording medium in the edition mode, and is read out from the recording medium in the monitor mode for use in processing image data of the concerned picture frame that is picked up through the image scanner, it is unnecessary to record the edited image data. Accordingly, a small capacity recording medium, e.g. a magnetic recording layer on IX 240 filmstrip, may be used for recording the edit data.

In the above embodiment, each edition process such as pasting, relocating or deleting the picture frame, or changing the magnification of the picture frame, is displayed time-sequentially in the monitor mode. It is also possible to display other image processing steps in the monitor mode. For example, when the user wishes to make the image enhancement, the user may define a range of those parameters which determine the degree of enhancement. Then, a picture frame is displayed while varying the enhancement parameters with the time within the range, so the user can observe the degree of enhancement that varies with the change of the parameters. In the same way, it is possible to display the change of parameters for the smoothing, unsharpening, density correction, color balance correction, or soft-focusing in the time sequential fashion. Furthermore, it is possible to display the process of giving special effect or texture, like watercolor texture or oil painting texture, to the image.

Although the image editing monitoring apparatus 150 automatically prepares edit data files during the edition processes and stores them in the form as shown in FIG. 31, it is possible to prepare edit data files by use of a text editor or the like. It is also possible to modify the edit data prepared during the edition processes by use of the text editor or the like. For example, another edit command may be added to the edit data, or the sequence of deletion may be changed. The edit data of each edition process itself may also be modified.

The image editing monitoring apparatus of the present invention is applicable not only to editing images photographed on photo film, but also to editing the photographed image in combination with image data stored in other recording media, e.g. image data obtained from a TV broadcasted signal, a video image signal, image data or word data from a personal computer.

Thus, the present invention is not to be limited to the above embodiments but, on the contrary, various modifications may be possible to those skilled in the art without departing from the scope of claims attached hereto.

What is claimed is:

1. A printing method for making a print from a picture frame photographed on a photo film and an image added by a user, the method comprising the steps of:

inputting ID data of the picture frame in a data communication terminal;

inputting image data of the image to add in the data communication terminal;

storing the input image data of the image in association with the ID data of the picture frame as a data file in the data communication terminal;

transferring the data file from the data communication terminal to a data processing device installed in a photofinisher, as the photo film is forwarded to the photofinisher for printing; and making a print containing the added image and the picture frame based on the picture frame and the data file.

2. A printing method as claimed in claim 1, wherein the ID data of the picture frame is read from the photo film or a cartridge thereof by a camera, and is sent from the camera to the data communication terminal.

3. A printing method as claimed in claim 1, wherein the ID data of the picture frame is read from the photo film by a photographic image reproduction device which picks up image data of the picture frame from the photo film after being developed, and displays an image of the picture frame.

4. A printing method as claimed in claim 1, wherein the image to add is input as a drawing in the data communication terminal through a digitizer.

5. A printing method as claimed in claim 1, wherein the image to add is input as characters in the data communication terminal through character recognition.

6. A printing method as claimed in claim 1, wherein the image to add is input as characters in the data communication terminal through voice recognition.

7. A printing method for making a print from a picture frame photographed on a photo film, and an image added by a user, the method comprising the steps of:

inputting image data of the image to add in a data communication terminal;

transferring the input image data from the data communication terminal to a data recording device;

recording the input image data on a data recording medium by the data recording device in association with the picture frame; and making a print of the picture frame and the added image from the picture frame and the input image data read out from the data recording medium, so that the print contains the picture frame with the added image within the picture frame.

8. A printing method as claimed in claim 7, wherein the data recording medium is a magnetic recording layer of the photo film, and a magnetic recording device incorporated into a camera is used as the data recording device.

9. A printing method as claimed in claim 7, wherein the data recording medium is a magnetic recording layer of the photo film, whereas a magnetic recording device incorporated into a photographic image reproduction device is used as the data recording device, the photographic image reproduction device picking up image data of the picture frame from the photo film after being developed, to display an image of the picture frame.

10. A printing method for making a print from a picture frame of a photo film, and an image added by a user, the method comprising the steps of:

inputting image data of the image to add and ID code data of the image in a data communication terminal;

storing the input image data and the ID code data in the data communication terminal;

transferring the ID code data to a data recording device;

recording the ID code data on a data recording medium by the data recording device in association with the picture frame;

forwarding the data recording medium together with the photo film to a photofinisher for printing;

transferring the input image data and the ID code data from the data communication terminal to a data processing device installed in a photofinisher;

correlating the input image data with the picture frame with reference to the ID code data; and making a print containing the picture frame and the added image from the picture frame and the input image data.

11. A printing method as claimed in claim 10, wherein the data recording medium is a magnetic recording layer of the photo film, and the data recording device is a magnetic recording device incorporated into a camera.

12. A printing method as claimed in claim 10, wherein the data recording medium is a magnetic recording layer of the photo film, and the data recording device is a magnetic recording device incorporated into a photographic image reproduction device which picks up image data of the picture frame from the photo film after being developed, and displays an image of the picture frame.

13. A printing method for making a print from a picture frame photographed on a photo film and an image added by a user, the method comprising the steps of:

recording date and time of photography of the picture frame on the photo film along with each picture frame by a camera;

inputting image data of the image to add in a data communication terminal;

recording the input image data along with date and time of inputting the image data as a data file in the data communication terminal;

transferring the data file from the data communication terminal to a data processing device of a photofinisher, as the photo film is forwarded to the photofinisher for printing;

correlating the input image data with the picture frame by comparing the date and time of inputting the image data with the date and time of photography; and making a print containing the picture frame and the added image based on the picture frame and the input image data.

* * * * *